United States Patent [19]

Uppaluru

[11] Patent Number: 5,915,001
[45] Date of Patent: Jun. 22, 1999

[54] SYSTEM AND METHOD FOR PROVIDING AND USING UNIVERSALLY ACCESSIBLE VOICE AND SPEECH DATA FILES

[75] Inventor: Premkumar V. Uppaluru, Cupertino, Calif.

[73] Assignee: Vois Corporation, Redwood City, Calif.

[21] Appl. No.: 08/748,943

[22] Filed: Nov. 14, 1996

[51] Int. Cl.$^6$ ................................................ H04M 1/64
[52] U.S. Cl. ................................. 379/88.22; 379/88.17
[58] Field of Search ............................... 379/67, 88, 89, 379/93.05, 201, 67.1, 88.01, 88.04, 88.16, 88.17, 88.19, 88.2, 88.21, 88.22, 88.23, 88.24, 88.27; 704/270, 271, 272, 275; 370/401; 395/200.3, 200.33, 200.47, 200.48, 200.49, 200.55

[56] References Cited

U.S. PATENT DOCUMENTS

| | | | |
|---|---|---|---|
| 4,053,710 | 10/1977 | Advani et al. | 179/1 SB |
| 4,253,157 | 2/1981 | Kirschner et al. | 364/900 |
| 4,534,056 | 8/1985 | Feilchenfeld et al. | 381/42 |
| 4,648,061 | 3/1987 | Foster | 264/900 |
| 4,653,097 | 3/1987 | Watanabe et al. | 381/42 |
| 4,659,877 | 4/1987 | Dorsey et al. | 379/88 |
| 4,763,278 | 8/1988 | Rajasekaran et al. | 364/513.5 |
| 4,785,408 | 11/1988 | Britton et al. | 364/513.5 |
| 4,788,643 | 11/1988 | Trippe et al. | 364/407 |
| 4,831,551 | 5/1989 | Schalk et al. | 364/513.5 |
| 4,833,713 | 5/1989 | Muroi et al. | 381/43 |
| 4,839,853 | 6/1989 | Deerwester et al. | 364/900 |
| 4,896,319 | 1/1990 | Lidinsky et al. | 370/60 |
| 4,922,538 | 5/1990 | Tchorzewski | 381/42 |
| 4,945,476 | 7/1990 | Bodick et al. | 364/413.02 |
| 4,953,085 | 8/1990 | Atkins | 364/408 |
| 4,972,349 | 11/1990 | Kleinberger | 364/900 |
| 4,989,248 | 1/1991 | Schalk et al. | 381/42 |
| 5,007,081 | 4/1991 | Schmuckal et al. | 379/354 |
| 5,020,107 | 5/1991 | Rohani et al. | 381/43 |
| 5,054,082 | 10/1991 | Smith et al. | 381/42 |
| 5,062,074 | 10/1991 | Kleinberger | 364/900 |
| 5,127,043 | 6/1992 | Hunt et al. | 379/88 |
| 5,144,672 | 9/1992 | Kuriki | 381/41 |
| 5,146,439 | 9/1992 | Jachmann et al. | 369/25 |
| 5,224,163 | 6/1993 | Gasser et al. | 380/30 |
| 5,243,643 | 9/1993 | Sattar et al. | 379/88 |
| 5,247,497 | 9/1993 | Cohn | 369/26 |
| 5,247,575 | 9/1993 | Sprague et al. | 380/9 |
| 5,255,305 | 10/1993 | Sattar | 379/34 |
| 5,274,695 | 12/1993 | Green | 379/88 |

(List continued on next page.)

OTHER PUBLICATIONS

Hemphill, et al., "Surfing the Web by Voice", Multimedia '95, Oct. 1995, pp. 215–221.

Nahm, E.R., "Speech Recognition Makes Using the Internet Easier Than Ever—Press Release", Sep. 12, 1996, pp. 1–2.

Dave Krupinski; "Computer Telephony and the Internet"; 1996 Stylus Product Group; published on the World Wide Web at the URL "http://www.stylus.com"; publication date unknown but prior to Nov. 14, 1996; pages not numbered.

*Primary Examiner*—Scott Weaver
*Attorney, Agent, or Firm*—Fenwick & West, LLP

[57] ABSTRACT

A system and method provides universal access to voice-based documents containing information formatted using MIME and HTML standards using customized extensions for voice information access and navigation. These voice documents are linked using HTML hyper-links that are accessible to subscribers using voice commands, touch-tone inputs and other selection means. These voice documents and components in them are addressable using HTML anchors embedding HTML universal resource locators (URLs) rendering them universally accessible over the Internet. This collection of connected documents forms a voice web. The voice web includes subscriber-specific documents including speech training files for speaker dependent speech recognition, voice print files for authenticating the identity of a user and personal preference and attribute files for customizing other aspects of the system in accordance with a specific subscriber.

11 Claims, 12 Drawing Sheets

U.S. PATENT DOCUMENTS

| | | | |
|---|---|---|---|
| 5,278,942 | 1/1994 | Bahl et al. | 395/2 |
| 5,293,452 | 3/1994 | Picone et al. | 395/2.59 |
| 5,297,183 | 3/1994 | Bareis et al. | 379/59 |
| 5,297,194 | 3/1994 | Hunt et al. | 379/88 |
| 5,325,421 | 6/1994 | Hou et al. | 379/67 |
| 5,335,276 | 8/1994 | Thompson et al. | 380/21 |
| 5,335,313 | 8/1994 | Douglas | 395/2.84 |
| 5,343,529 | 8/1994 | Goldfine et al. | 380/23 |
| 5,355,433 | 10/1994 | Yasuda et al. | 395/2.52 |
| 5,359,508 | 10/1994 | Rossides | 364/401 |
| 5,365,574 | 11/1994 | Hunt et al. | 379/88 |
| 5,388,213 | 2/1995 | Oppenheimer et al. | 395/200 |
| 5,390,278 | 2/1995 | Gupta et al. | 395/2.52 |
| 5,410,698 | 4/1995 | Danneels et al. | 395/650 |
| 5,430,827 | 7/1995 | Rissanen | 395/2.82 |
| 5,448,625 | 9/1995 | Lederman | 379/67 |
| 5,452,340 | 9/1995 | Engelbeck et al. | 379/67 |
| 5,452,341 | 9/1995 | Sattar | 379/88 |
| 5,452,397 | 9/1995 | Ittycheriah et al. | 395/2.49 |
| 5,454,030 | 9/1995 | de Oliveira et al. | 379/100 |
| 5,463,715 | 10/1995 | Gagnon | 395/2.76 |
| 5,465,290 | 11/1995 | Hampton et al. | 379/67 |
| 5,479,491 | 12/1995 | Herrero Garcia et al. | 379/88 |
| 5,479,510 | 12/1995 | Olsen et al. | 380/24 |
| 5,483,580 | 1/1996 | Brandman et al. | 379/88 |
| 5,485,370 | 1/1996 | Moss et al. | 364/408 |
| 5,486,686 | 1/1996 | Zdybel, Jr. et al. | 235/375 |
| 5,487,671 | 1/1996 | Shpiro et al. | 434/185 |
| 5,490,251 | 2/1996 | Clark et al. | 395/200.2 |
| 5,499,288 | 3/1996 | Hunt et al. | 379/88 |
| 5,510,777 | 4/1996 | Pilc et al. | 340/825 |
| 5,513,272 | 4/1996 | Bogosian, Jr. | 382/116 |
| 5,517,605 | 5/1996 | Wolf | 395/155 |
| 5,526,620 | 6/1996 | Krause | 395/600 |
| 5,530,852 | 6/1996 | Meske, Jr. et al. | 395/600 |
| 5,533,115 | 7/1996 | Hollenbach et al. | 379/220 |
| 5,534,855 | 7/1996 | Shockley et al. | 340/825.3 |
| 5,537,586 | 7/1996 | Amram et al. | 395/600 |
| 5,542,046 | 7/1996 | Carlson et al. | 395/186 |
| 5,544,255 | 8/1996 | Smithies et al. | 382/119 |
| 5,544,322 | 8/1996 | Cheng et al. | 395/200.12 |
| 5,548,726 | 8/1996 | Pettus | 395/200.09 |
| 5,550,976 | 8/1996 | Henderson et al. | 395/200.06 |
| 5,551,021 | 8/1996 | Harada et al. | 395/600 |
| 5,608,786 | 3/1997 | Gordon | 379/100 |
| 5,613,012 | 3/1997 | Hoffman et al. | 382/115 |

SYSTEM AND METHOD FOR PROVIDING AND USING UNIVERSALLY ACCESSIBLE VOICE AND SPEECH DATA FILES

BACKGROUND OF THE INVENTION

1. Field of the Invention

This invention relates generally to the construction and use of distributed interactive voice and speech processing systems, including interactive voice response (IVR) systems and voice messaging (VM) systems. More particularly, the invention relates to form based publishing of voice information and the use of universally accessible personal profiles for authentication of the user by voice signatures and generating context sensitive active vocabularies to improve speaker dependent speech recognition. The invention also relates to the use of the user attributes and preferences stored in universally accessible personal profiles to improve the efficiency of navigation and search as well as efficacy of search results pertaining to user queries.

2. Description of the Related Art

Conventional interactive voice response (IVR) systems allow a user to place a telephone call into a system, navigate (generally using touch tone input) through a hierarchy of options in response to voice prompts and retrieve information stored in a computer database. Airlines, banks, credit companies and many other service organizations are just a few examples of the types of businesses using IVR systems to allow a customer (or prospective customer) to retrieve desired information. These conventional systems are generally organization-specific in that they offer access to a single database or set of databases related to the goods, services or other aspects of the organization maintaining the IVR system. Thus, conventional IVR technology is used to offer access to information specific to a single organization (i.e. a specific airline, bank or credit company). For example airlines typically use IVR to allow callers to access flight arrival and departure information or to select reservation options, for the particular airline only.

It is desirable to provide an IVR system that enables access to an aggregation of databases and services rather than a single database and service. One barrier to the provision of aggregated services in an IVR system is that conventional IVR systems do not have a distributed information publishing means. Conventional IVR systems do not have a mechanism for service/information providers to readily access the IVR system and add updated or entirely new information for publication on the IVR system.

Further, conventional IVR systems are generally configured for uniform access by any caller admitted to the IVR system. Each caller is handled by the system in the same manner and offered an identical set of options. One reason that IVR systems use uniform user interfaces for each caller rather than caller-specific configurations is that conventional IVR systems operate in "closed" computer environments hosting the particular IVR system. Thus, when a caller accesses a conventional IVR system, the only caller-specific information which the system has at its disposal, is any information previously provided by the caller which the system has maintained or any information that is provided by the caller during the IVR session (i.e. when a user enters an account number using touch tone telephone input). Because, however, collecting and storing caller-specific information with conventional technology is cumbersome and time consuming, most IVR systems do not offer caller-specific (caller customized) features.

There are numerous applications in which it is desirable for an IVR system to use caller-specific information in handling a call. Caller-specific information in the form of user preferences can aid in minimizing the size of a command tree which the user must navigate to access desired information. Additionally, caller specific information could also be used to authenticate the identity of a user in cases where security is an issue (i.e. in bank and credit contexts). Further, caller-specific speech training profiles could be used to implement speaker dependent speech recognition to allow for a caller to use voice commands in place of touch-tone commands. Still further, an IVR system having access to caller-specific data could be used to apply IVR technology in new application areas such as personal productivity.

Thus, there is a need for an improved voice and speech processing system that provides universal access to caller-specific information to provide user-customized IVR systems. Further, there is a need to provide universal access to voice and speech files in order to allow widespread use of such files for caller authentication and for performing speaker dependent speech recognition in IVR systems.

SUMMARY OF THE INVENTION

The system and method of the present invention extends World Wide Web (referred to herein as "www" or the "web") and Internet technology to provide universally accessible caller-specific profiles that are accessed by one or more IVR systems. The invention features a set of web pages containing information (components) formatted using MIME and hypertext markup language (HTML) standards with extensions for voice information access and navigation. These web pages are linked using HTML hyper-links that are accessible to users via voice commands and touch-tone inputs. These web pages and components in them are addressable using HTML anchors and links embedding HTML universal (uniform) resource locators (URLS) rendering them universally accessible over the Internet. This collection of connected web pages are referred to herein as the "voice web" and the individual pages are referred to herein as "voice web pages". Each web page in the voice web contains a specially tagged set of key words and touch tone sequences that are associated with embedded anchors and links used for navigation within the web.

In addition, the invention features a set of linked HTML pages representing the user's "personal profile". The personal profile contains user's attributes and preferences. Attributes include user's name, address, phone number, personal identification code, voice imprints for authentication, speech training profile and other information. Preferences include, configuration preferences such as personal greetings and gender and language selection, selection preferences such as bookmarks and favorite places and presentation preferences such as priority ordering, default overrides and preferred vocabulary.

The personal profile is designed for component access within web pages allowing easy extraction of context sensitive profile information. In particular, speech training profiles (included as a user attribute and which contain word patterns representing speaker dependent training information) partitioned into sets of related words likely to occur in combination within corresponding voice web pages. A set of command and control words such as "play, pause, continue, previous, next, home, reload, help, etc." are stored in a top level component set enabling user dependent but context independent navigation and control. Other component sets are designed to match the key word sets in corresponding voice web pages such as a calendar page or an address book page enabling user and context dependent navigation and control.

When a user calls into the distributed voice and speech processing system associated with the voice web, the system first identifies the user utilizing a unique account number (such as phone number or social security number). Next, it accesses the user's personal profile using the corresponding URL and retrieves the user attributes and preferences related to authentication and security. Using this personal profile information, the voice web system authenticates the identity of the user using a combination of personal identification code based password checking and voice imprint matching. The voice imprint is any sufficiently long utterance or phrase that the user has previously entered into his/her profile. Each user's voice imprint is analyzed and stored in the profile for quick matching on demand with a real-time provided user sample. The combination of every individual's unique vocal characteristics stored in the voice imprint coupled with the random choice of the password phrase ensures a high degree of security and authentication.

Once authenticated, the user is allowed to navigate and access more information from the voice web using voice commands. In order to effectively accomplish this task, the voice web system retrieves the context independent command and control key word set from the user's speech profile.

The voice web system then presents a top level voice web personal home page for user's perusal. At the same time, it retrieves the set of word recognition patterns associated with the key words in the presented page from the user's speech profile. Thus, the system is able to match the active vocabulary and associated speaker dependent word patterns dynamically in a context sensitive manner. The process continues as the user navigates from page to page. The voice web system dynamically retrieves the suitable subset of training word patterns from the user's speech profile matching the voice navigation key words in the page being presented to the user.

The process described above greatly reduces the size of the training information that needs to be retrieved at any time while significantly enhancing accuracy of speech recognition using speaker dependent training profiles. Since the speech profile is constructed using HTML pages and components, it is universally accessible using its URL. This enables the user to call into any compatible Internet connected voice web system in user's proximity from anywhere in the world, identify himself/herself to the system and then enable the system to dynamically retrieve suitable information that enhances his/her navigation and access of the information stored in the voice web using voice commands and input.

In addition to the user attribute information discussed above, the personal profile contains user preferences relative to configuration, presentation and information selection. These preferences are components within the personal profile pages and are easily available to the voice web system for dynamic retrieval. For example, if the user requests his/her stock portfolio from the voice web, it first retrieves the user's preferred portfolio of companies from his/her profile and applies this list to limit the search on stock quotes from all companies. The user gets exactly the information relevant to his/her interest in exactly the order of priority he/she prefers.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

System Description

Figure 1:
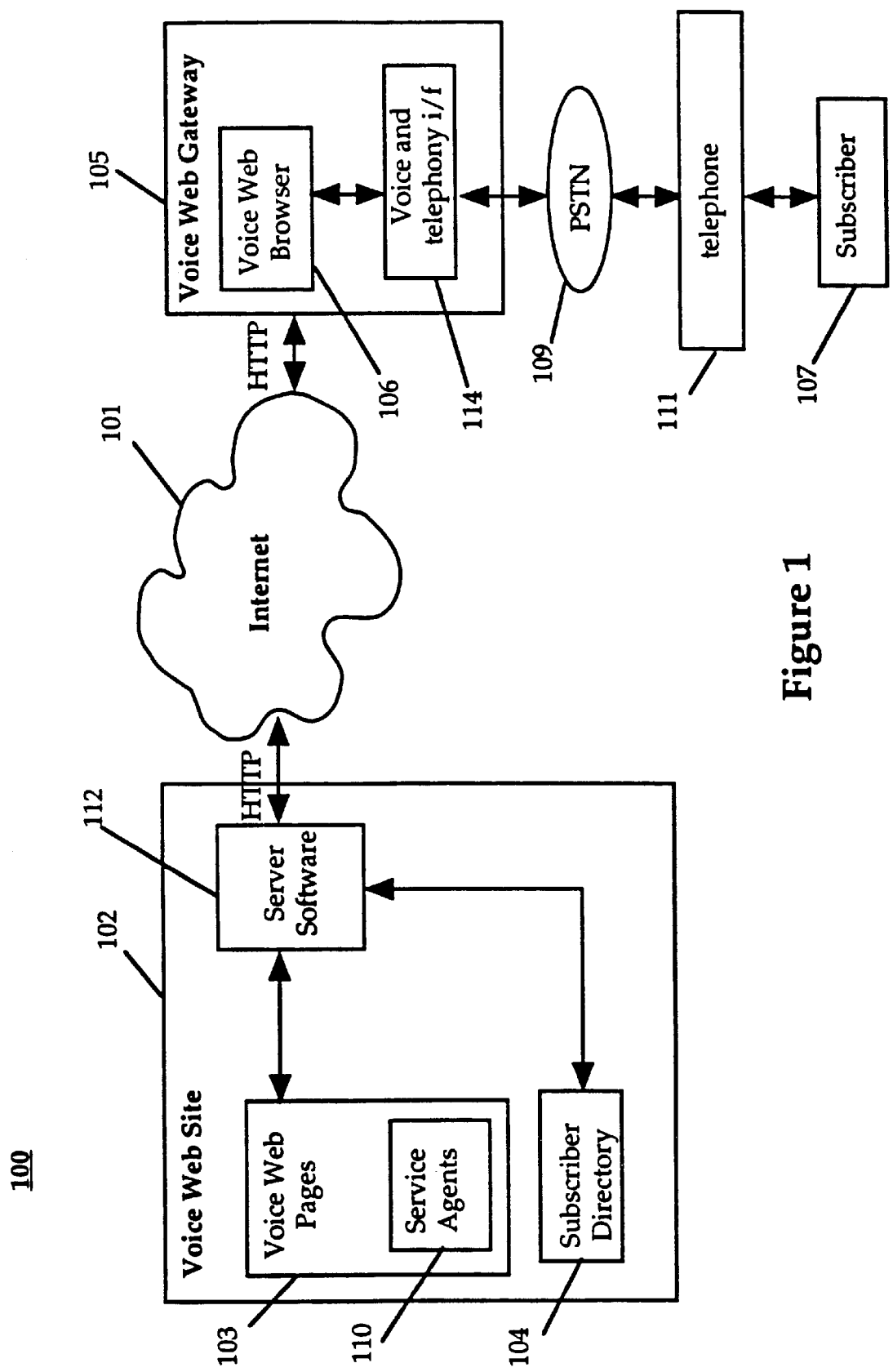
FIG. 1 is a functional block diagram of a voice web system in accordance with the present invention.

FIG. 1 is a functional block diagram of a voice web system 100 in accordance with the present invention. Voice web system 100 extends the conventional internet and world wide web ("web" or www) technology to voice and speech processing applications and also enables new uses for interactive voice response (IVR) technology. Voice web system 100 includes one or more voice web sites 102 coupled to one or more voice web gateways 105 via the Internet 101. Voice web sites 102 and voice web gateways 105 transfer files over Internet 101 in accordance with hypertext transport protocol (HTTP). A subscriber 107 accesses the voice web system 100 by coupling to the gateway 105 using a telephone 111 coupled to the public switched telephone network (PSTN) 109.

Internet 101 is a system of linked communications networks that facilitate communication among computers which are coupled to internet 101. Generally, internets such as Internet 101 facilitate communication by providing file transfer, electronic mail and news group services. Internet 101 is preferably the Internet which evolved from the ARPANET and which is publicly accessible world wide. It should be understood however, that the principles of the present invention apply to other internets and even closed (private) networks such as corporate intranets.

It should be noted that system 100 may include numerous voice web sites 102 and numerous voice web gateways 105. A single voice web site 102 and a single voice web gateway 105 are shown in FIG. 1, however, to keep the figure uncluttered. Thus, voice web system 100 is a collection of voice web gateways 105 and voice web sites 102 connected over internet 101 enabling subscribers 107 to access voice web pages 103 via their telephones as shown in FIG. 1.

A voice web page 103 is web page specified using a navigable markup language that includes voice extensions. A navigable markup language is an enhanced type of markup language that facilitates publication navigation and access of information stored in documents specified in the navigable markup language. An exemplary markup language is the Hypertext Markup Language 2.0, RFC1866, HTML working group of Internet Engineering Task Force, Sep. 22, 1995, edited by D. Connolly published on the www at the following uniform resource locator (URL) address: http://w3.org/pub/www/Markup/html-spec.

A markup language is a language that includes a set of conventions for marking portions of a document so that, when accessed by a parsing program such as a web browser, each marked portion is presented to a user with a distinctive format. In contrast to formatting codes used by word processing programs, markup language codes, called tags, do not specify exactly how the tagged portion should be presented. Instead the tags inform the web browser (parser) that the information is in a certain portion of a document such as title, heading, form or text and the like. The web browser (parser) determines how to present the tagged information.

A navigable markup language is an enhanced markup language that uses tags that are anchors and that are links. When these link and anchor tags are invoked, a user is then presented another navigable markup language document in accordance with the link and anchor tags. This link is sometimes called a hyperlink. A hyperlink is a reference to another markup language document which when invoked facilitates access of the referenced markup language document.

A navigable markup language thus uses attributes, tags and values that enable (i) a publisher to specify the presentation of information to a user; (ii) a user to interactively access the stored information; and (iii) a user to access other navigable markup language documents using hyperlinks.

The navigable markup language used to specify voice web pages 103 is HyperVoice Markup Language (HVML). HVML is a version of HTML that includes voice extensions as described in Appendix A, incorporated herein by reference. Voice web pages 103 include HVML tags and attributes that extend HTML to facilitate publication, navigation and access to voice information. For example, HVML specifies functions and protocols that facilitate voice and speech processing including voice authentication, speaker dependent speech recognition, voice information publishing (e.g. creating a voice form) and voice navigation.

Just as conventional web documents are displayed for the user, voice web documents 103 are "played" to a subscriber over a telephone. A voice web page 103 is played (by voice web browser 106) by sequentially presenting the embedded voice components according to the HVML and MIME specifications.

While a conventional web site enables on-demand access over an internet to conventional web pages, voice web site 102 enables on demand access to voice web pages 103. Voice web site 102 is a computer that hosts voice web pages 103 and serves them up to other computers (i.e. voice web gateway 105). More specifically, voice web server 102 is a computer configured with conventional web server software 112 and which has access to stored voice web pages 103. A voice web site 104 additionally optionally includes a subscriber directory 104 that stores a list of registered system subscribers. Voice web site 102 stores, serves and manages voice web pages 103 and can execute associated external scripts or programs in accordance with the present invention. These external scripts and programs interface with databases and other information sources both internal and external to web site 102.

Voice web gateway 105 is a computer connected to the internet 101. Voice web gateway 105 also includes a conventional voice telecommunications interface 114 for coupling to the public switched telephone network (PSTN) 109 for telephonic communications with a subscriber 107. Telephone 111 is any voice enabling telecommunications device. Exemplary telephones include conventional desktop telephones, portable telephones, cellular telephones, analog telephones, digital telephones, smart phones and a computer configured to operate as a telephone and perform telephonic functions. Thus voice web pages 103 are universally accessible from any ordinary telephone 111. Alternatively, a subscriber 107 may access voice web pages 103 either by using a subscriber interface local to voice web gateway 105 (i.e. a direct user interface with voice web gateway 105) or by dialing into voice web gateway 105 using another computer such as a personal digital assistant or a smart phone.

Voice telecommunications interface 114 serves as an interface between a voice web browser 106 and telephone 111 and preferably includes conventional telephony and voice processing hardware and software enabling voice web gateway 105 to receive and answer telephone calls, respond to touch tone and voice commands, route and conference calls, play voice prompts and record voice messages.

Voice web gateway 105 additionally hosts a voice web browser 106. Voice web browser 106 is a computer program capable of accessing and processing voice web pages 103 in response to a request placed by subscriber 107. More specifically, voice web browser 106 (i) processes voice and touch tone activated subscriber commands, (ii) retrieves requested voice web pages 103 from the appropriate voice web site 102, (iii) interprets the embedded markup language (HVML) in the retrieved voice web page 103 and (iv) delivers the contents of a voice web page 103 to a subscriber 107 over the telephone 111. In performing the above-mentioned processing, voice web browser 106 executes scripts, including "voice scripts" embedded in a voice web page 103. Voice web browser 106 provides a subscriber 107 with fast, easy, convenient voice activated navigation and access to voice web pages 103.

Voice web browser 106 is a conventional web browser modified with appropriate voice information playback and recording extensions and enhancements. Appendix A includes a specification of HVML and voice web browser commands and is incorporated herein by reference.

Some voice web pages 103 contain references to scripts and programs that operate as service agents 110) to respond to subscriber requests as well as external events and carry out prescribed actions. These scripts and programs are externally stored on voice web sites 102 (for example as Common Gateway Interface (CGI) Scripts or Internet Services Application Programming Interface (ISAPI) programs). These external scripts and programs execute in the voice web server 102 environment as a service agent 110. The external scripts and programs that comprise service agents 110 are referred to by URLs embedded in an associated voice web page 103. In the case of a voice web page 103 that is a voice form, the script or program associated with the service agent executes in response to voice form submission by a subscriber 107. Service agents 110 follow standard Internet protocols such as HTTP, and conform to conventional formats such as MIME and application programming interfaces (APIs) such as CGI and ISAPI.

HVML Description

Conventional web pages are designed primarily for presentation on a computer color monitor and navigation by a mouse and key board. As such, graphics, images and text are the primary media types supported widely. Although, audio, video and 3-dimensional graphics extensions are becoming available, these extensions are directed primarily at computer users and not telephone users.

Voice web pages 103 consist of HTML pages that have been extended with Hyper Voice Markup Language (HVML) for easy and effective navigation and access of voice information via a voice activated device such as an ordinary telephone. Voice web pages 103 retain all the properties and behavior of conventional HTML pages such as HTML markup tags, universal identifiers (URLs), and hyper-links and can be accessed by a conventional web browser using HTTP protocols from a conventional web server. The additional markup tags are interpreted by an HVML extended web browser to enable subscribers 107 to navigate and access voice web pages 103 over the phone or similar voice activated device. Appendix A includes a specification of HVML and voice web browser commands and is incorporated herein by reference.

HVML pages web pages voice web page 103 are specially designed for presentation using an ordinary telephone 111 and navigation using touch tones and voice commands. This is in contrast to conventional multimedia web pages that may embed audio data to be presented on a multimedia personal computer using its speakers and navigated using its mouse, key board and microphone. Although, HVML voice web pages 103 can be embedded in generic multimedia web pages, thus sharing some of the information, they are designed to be presented using an ordinary phone and navigated using commands generated by touch tone signals and speech recognition.

An HVML web page (voice web page 103) is first and foremost an HIML page. Each web page 103 has a unique universal resource locator (URL) (also called uniform resource locator). A URL is a string of characters that uniquely identifies an internet resource including an identification of (i) the access protocol to be used; (ii) an indication of resource type; and an identification of its location in the computer network. For example, the following fictitious URL identifies a www document: http://www.voiscorp.com/banner.gif uniquely identifies the location of a resource on the world wide web computer network. "http://" indicates the access protocol. "www.voiscorp.com" is the domain name of the computer on which the resource is located. "banner" is the name of the resource located on the computer specified by the domain name. "gif" indicates that the banner resource is a gif (graphical interchange file) type resource. Similarly, the following fictitious URL uniquely identifies the location of a voice web page 103: http://www.voiscorp.com/voicememo.hvml. In this example, "voicememo" is the name of the resource located on the computer specified by the domain name. "hvml" indicates that the voicememo resource is an hvml type resource. Thus, web pages 103 are each uniquely identified by their corresponding URL. Once located, a web page 103 can be created, edited and played using existing web publication tools, it can be stored on any conventional web server anywhere on the Internet, it can be accessed by any conventional web browser and presented on a computer monitor, it can be navigated using the computer's mouse, keyword, and (with some additional plug-ins) microphone, and it can contain embedded anchors and hyper links to other HTML pages, including other HVML pages.

Voice web pages 103 are designed for three primary purposes: (i) presenting structured voice information to a user; (ii) enabling the user to navigate across and within voice pages; and (iii) capturing user input for information queries or submission.

a. HVML Presentation

Presentation of voice information is accomplished primarily by the voice tag. The voice tag has a type attribute which specifies the type of voice information to be presented. If the type attribute has the file value, the voice information is obtained from a voice file specified by its URL. If the type attribute has the text value, the voice information is synthesized from the specified text. If the type attribute has number, ordinal, currency, date, or character value, then the voice information is generated by concatenating voice fragments from a pre-recorded indexed system voice file. If the type attribute has the stream value, then the voice information is obtained from the voice stream specified by its URL. Composition of several voice elements into a seamless voice string is accomplished by the voice-string tag.

Combining these tags, publishers can compose and present: (i) pre-recorded voice prompts and messages; (ii) voice prompts generated using text-to-speech technology; and (iii) Pre-formatted voice prompts with dynamic speech synthesis elements.

b. HVML Navigation

Navigation of voice web pages 103 is primarily accomplished by extending the HTML anchor tag with new attributes—tone and label. These attributes are used in conjunction with the existing href attribute in an anchor element that makes the anchor into a hyper link. When the user selects the touch tone signals specified by the value of the tone attribute or utters the word specified by the label attribute, the browser invokes the corresponding hyper link. The tone and label attribute values must be unique within a page. Navigation is also accomplished by system commands such as next, previous, reload, home, bookmarks, help, fax, and history which are invoked by specific touch tone sequences or utterance of the words. Users can control the voice browser operations by issuing system commands such as stop, start, play, pause, exit, backup, and forward. Using these attributes, publishers can enable (i) touch tone command and control and link navigation; (ii) pre-defined, system and user specific, spoken command and control key word recognition; and (iii) page and user specific spoken command and control key word recognition.

c. HVML Forms

HVML uses the form tag to enable user input similar to HTML including the method attribute which specifies the way parameters are passed to the server and the action attribute which specifies the procedure to be invoked by the server to process the form. HVML extends the input tag within forms by introducing voice-input tag. Voice-input takes a type attribute similar to the input tag with three new values "voice", "tone" and "review" in addition to the existing "reset" and "submit" values. The HVML browser pauses at each voice-input statement in a HVML form until the specified input is supplied or input is terminated, before processing the remaining form. Using these tags and attributes, publishers can enable: (i) touch tone command and control and parameter input; (ii) pre-defined, user specific, spoken alphabet and digit input; (iii) page and user specific, spoken key word and proper names input; and (iv) free form voice information input.

Operational Description of the Voice Web Browser

Syntactic and structural intelligence, such as in-line pre-recorded voice prompts, pre-formatted voice prompts with dynamically generated voice elements, key word accessible anchor elements, voice responsive hyper links etc. are embedded in voice web pages 103 through voice access extensions to HTML. Behavioral intelligence including command interpretation, page access, file caching, HVML interpretation and user interaction is embedded voice web browser 106 (the HVML browser). Voice web browser 106 has the following states: (i) waiting for user commands; (ii) active accessing and playing HVML pages; and (iii) paused for user input.

Initially, voice web browser 106 is launched upon the system's receipt of a subscriber's telephone call. Once launched, voice web browser 106 goes through an initialization sequence that includes subscriber authentication and normally becomes "active" accessing and playing the subscriber's home page. Once the home page is played, voice web browser 106 "waits" for subscriber commands. As part of playing the page, the browser may "pause" for subscriber input and continue once the input is provided.

Independent of any specific voice web page 103 that a subscriber may be accessing, voice web browser 106 provides a set of navigational and operational commands. Within the telephone key pad, "*" and "#" are special keys that generate unique tones. Voice web browser 106 has special meaning for these keys. In general, the "*" key followed by a sequence of touch tones, excluding the "#" key, signals a browser command, an escape or a skip and the "#" key signals a link activation, termination of form input, termination of a key sequence or a selection.

Voice Web Services

Voice web system 100 can be used to provide voice web services to a subscriber 107. A voice web service is a service that provides on-line telephone based access to information. The information is presented to the user through the publication of voice web pages 103. The information presented to (published for) the subscriber may be information retrieved from a single information source or a combination of information sources including publicly accessible on-line databases, information proprietary to voice web system 100, information previously stored by subscriber 107 or another informaton source. Exemplary services provided by voice web system 100 include (i) personal information services such as calendar, address book, electronic mail, voice mail, (ii) information services such as headline news, weather reports, sports score, stock portfolio quotes, business white pages, yellow pages, classified information and (iii) transaction services (commerce services) such as banking, bill payments, stock trading, airline hotel and restaurant reservations and catalog store orders.

Users gain access to voice web services by becoming voice web subscribers 107. Subscribers 107 preferably sign up (e.g. register) for services through a service provider. In one embodiment, each subscriber 107 is assigned a unique account number on a calling card and subscribers 107 access the voice web system 100 by dialing a single "800" (e.g. toll free) service phone number and by then supplying their account number via the telephone 111. In an alternative embodiment, the services are publicly available and any user placing a call into the system is processed as a subscriber 107 without requiring any registration.

Figure 2A:
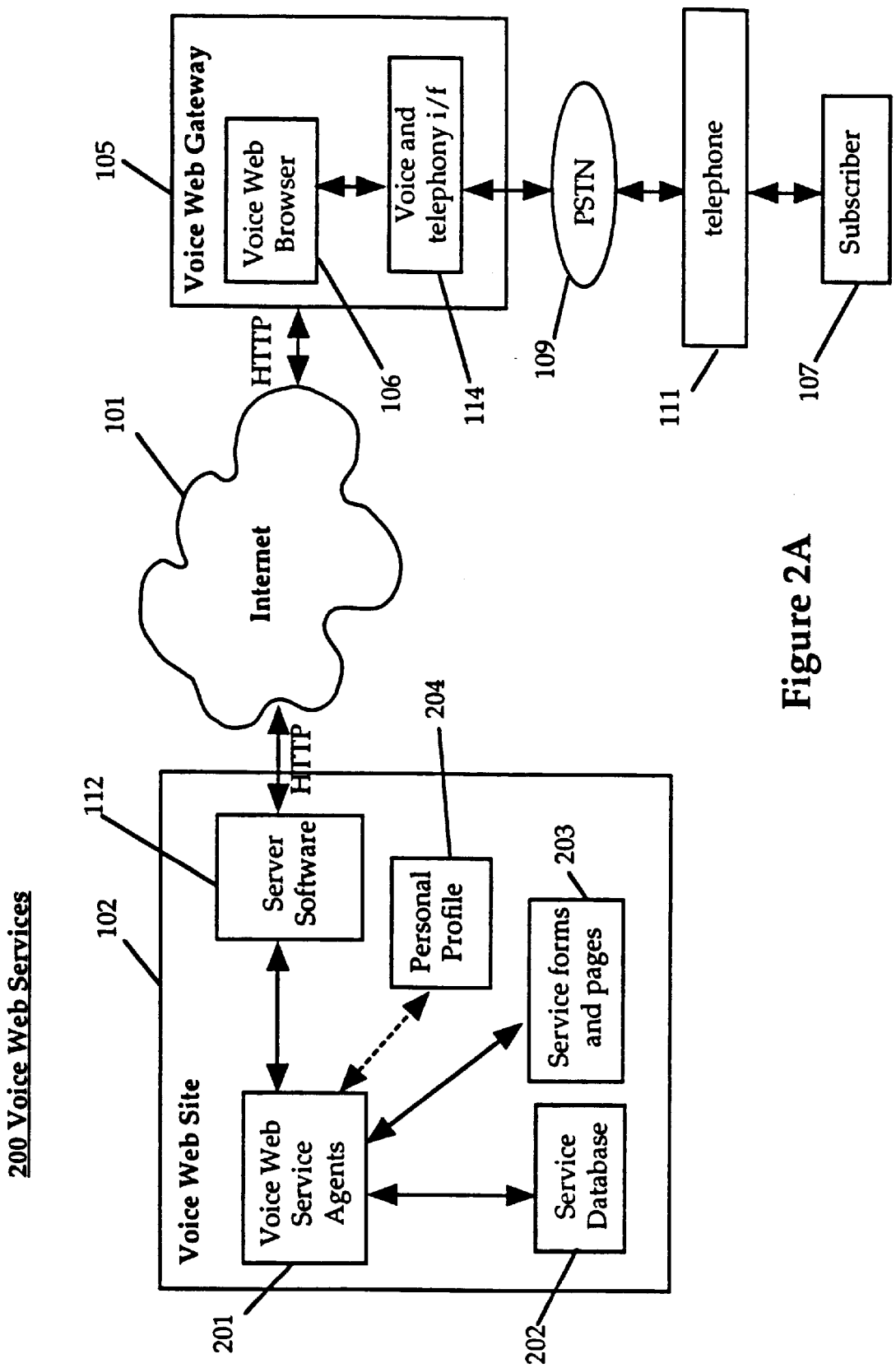
FIG. 2A is a functional block diagram of the voice web system shown in FIG. 1 configured to provide voice web services.

FIG. 2A is a functional block diagram of a voice web system 200 configured to provide voice web services to a subscriber 107. Voice web system 200 includes one or more voice web gateways 105 coupled to one or more service sites 202 via internet 101. Service site 200 is a voice web site 102 configured to provide voice web services. Each voice web service is implemented using a collection of service agents 201 and service pages 203 centered around a service database 202. Additionally, service site 200 optionally includes a personal profile 204 to be used to the extent that the service being provided requires pre-stored subscriber-specific information (i.e. pre-stored information personal to the particular subscriber).

Voice web service agents 201 are a type of service agent 110 (shown in FIG. 1) that execute on service site 102 to provide voice web services to a subscriber 107. Voice web service agents 201 are therefore scripts and programs represented by a web page 103 (show in FIG. 1).

Service database 202 is a database of service information. The content of the service information varies with the type of service being provided. For example, if voice web system 100 is configured to deliver a business white page service, then service database 202 is a database of address and phone number listings for businesses. If voice web system 100 is additionally or alternatively configured to deliver news headlines, then voice web system 100 includes a service database 202 that includes current news headlines.

Service forms and pages 203 are voice web pages 103 that are HVML templates (voice forms and pages) that are "filled in" in response to a specific subscriber request. Service pages and forms 203 are used to gather subscriber input, to retrieve information and to deliver (publish) information to a subscriber. Some service pages 203 are database entry and administration forms, some are database query forms and others are database response pages. Entry forms are used to add information to the database. Query forms are used to extract information from the database. Response pages are used to present retrieved information to the user. In the prefered embodiment, service agents dynamically generate service and pages forms 203 by retrieving requested data from service database 202 and using the retrieved data in place of corresponding variables stored in an HVML template. The HVML templates link to each other specifying request-response dependencies. Thus, subscribers 107 are able to enter and retrieve information in personal and external databases over internet 101 using web protocols without having to create a voice web page for each entry in service database 202.

Service agent 201 typically uses a service database 202 and a set of service pages and forms 203 to provide the corresponding voice web service. The service database 202 hosts the information that subscribers 107 wish to access. The service forms allow subscribers 107 to input and query information in service database 202. Service pages allow service agents 201 to present the requested information to the subscriber 107 using voice web browser 106.

Figure 2B:
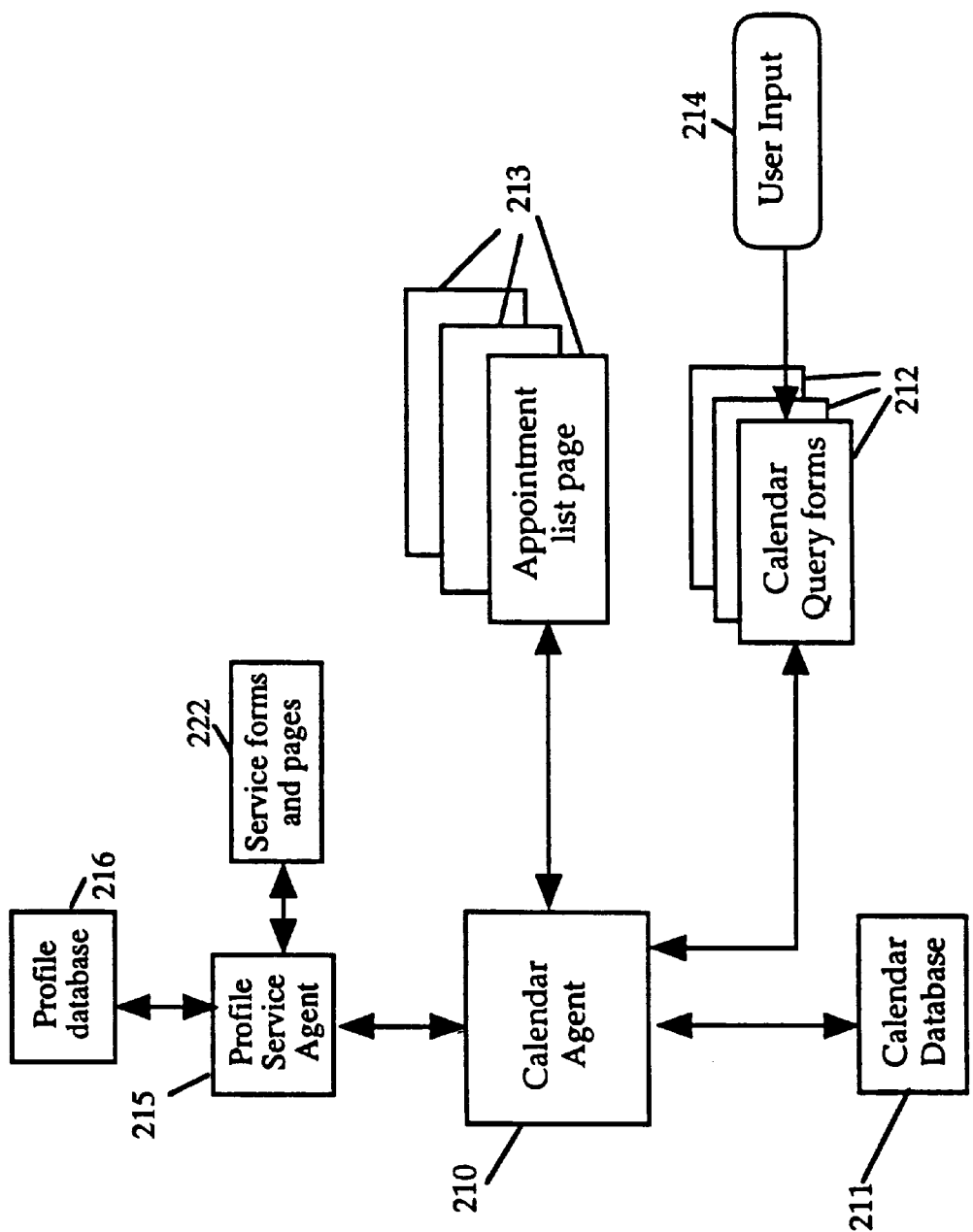
FIG. 2B is a functional block diagram of an exemplary calendar service.

FIG. 2B is a functional block diagram of an exemplary calendar service. The calendar service agent 210 uses the calendar database 211 together with the calendar and appointment details input and query voice web forms 212 and appointment list and details voice web pages 213. Subscribers fill in the calendar and appointment details input voice web forms 212 to set their calendar appointments and their details. The calendar service agent 210 processes the submitted form and updates the calendar service database 211. Later, subscribers can retrieve their appointments for any day by supplying 214 the month, date and year for that day in the calendar query voice web form 212. The calendar service agent 210 processes the submitted form, retrieves the matching appointments from the calendar database, and dynamically composes and returns the appointment list voice web page 213. If the subscriber requests for the details of any appointment, the calendar service agent 210 dynamically generates and supplies the corresponding appointment details page 213.

The Personal Voice Web

Figure 3:
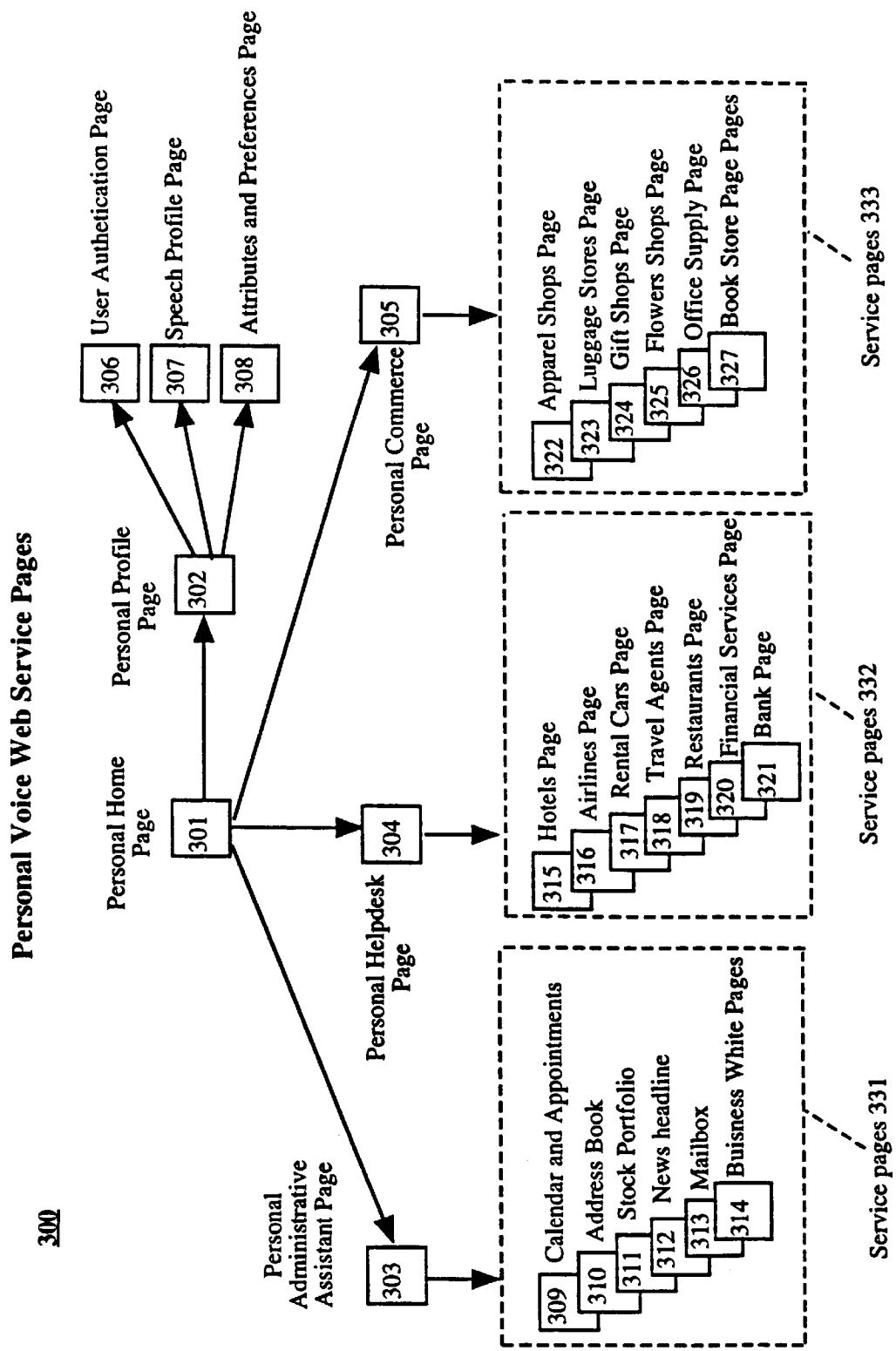
FIG. 3 illustrates personal voice web used to provide personal services using the system shown in FIG. 2A.

FIG. 3 shows a personal voice web 300 in accordance with the present invention. Personal voice web 300 is standardized collection of linked voice web pages and voice web forms (a special type of voice web page) that form a personal service space for the subscriber. Preferably, all subscribers share a common structure of linked voice web pages although the contents of personal voice web pages vary from subscriber to subscriber. Because each subscriber of the personal voice web system 300 has the linked page structure shown in FIG. 3, subscribers navigate about and access information from their personal voice web 300 in a standardized way. Each page in personal voice web 300 includes an agent that performs various processing tasks required for each respective page. At the root of personal voice web 300 is the personal home page 301. Personal home page 301 links to a personal profile page 302, a personal administrative assistant page 303, a personal helpdesk page 304, and a personal commerce page 305.

The personal administrative assistant page 303 is linked to a number of personalized voice web services (service pages) 330 including, by way of an example, a calendar and appointments page 309, an address book page 310, a stock portfolio page 311, a news headlines page 312, a mail box page 313, and a business white pages home page 314.

Calendar and appointments page 309 is used to provide an appointments service. The appointments service enables a subscriber to track personal and business appointments in a voice-based calendar. The subscriber thus adds and retrieves appointments over the phone using personal voice web 300. In addition to providing day and time information related to stored appointments, a subscriber may also store voice note annotations that is associated with a particular appointment.

Address book page 310 is used to provide an address service. The address service enables a subscriber to add and retrieve address, phone number, and other information related to individual names or company names. The information added and retrieved is stored in a address book service database private to the subscriber.

Stock portfolio page 311 is used to provide a stock quote service. The stock service enables a subscriber to retrieve current stock pricing and portfolio valuation information as well as statistical information related to changes in portfolio or stock positions. The stock service uses information retrieved from a stock portfolio service database private to the subscriber and additionally retrieves current stock pricing information from an on-line data-base or information source.

News headlines page 312 is usedenables ide a news service. The news service enables a subscriber to retrieve news headlines related to subscriber customized topics.

Mail box page 313 is used to provide a mailbox service. The mailbox service enables a subscriber to access electronic mail (e-mail) messages. The e-mail messages are played for the subscriber using text to speech conversion and a speech synthesizer.

Business white pages home page 314 is used to provide a white page service. The white page service enables a subscriber to enter partial company name, and optionally city name and state code to retrieve the company's full name, address and phone number.

Each service page 309–314 is part of a collection of voice forms and pages that are used by the corresponding service agent to retrieve a request from the subscriber, generate an appropriate database query responsive to the subscriber-request, retrieve subscriber-requested information, and generate a voice web page that incorporates the retrieved information and that is adapted for presentation (publication) to the subscriber using a voice web browser. Thus, for example the service agent associated with calendar and appointments page 309 generates a voice form for prompting a subscriber for month, day and year information. After receiving the prompted information, calendar and appointments service agent generates the appropriate query to extract the requested calendar information from a calendar service database. Once the calendar information is retrieved from the database, the calendar and appointments service agent generates a voice web page that includes the retrieved information. The new page is then presented (published) to the subscriber over the telephone by the voice web browser.

Each of the other personal service agents associated with personal service pages 308–327 operate in a similar way to provide a subscriber with information retrieved from associated service databases.

Personal helpdesk page 304 is linked to personal voice web helpdesk service pages 331 including, by way of example, a hotels page 315, an airlines page 316, a rental cars page 317, a travel agents page 318, a restaurants page 319, a financial services page 320, and a banks page 321. The personal helpdesk page has an associated personal helpdesk agent that is used to provide a set of helpdesk services. Helpdesk services enable a subscriber to access product, pricing, availability and other information of the corresponding services.

Hotels page 315 is used to provide a hotel reservation service. Airlines page 316 is used to provide an airline booking service. Rental cars page 317 is used to provide a rental car reservation service. Travel agents page 318 is used to provide a travel service. Restaurants page 319 is used to provide a menu and reservations service. Financial services page 320 is used to provide a financial service. Bank page 321 is used to provide a bank service.

Personal commerce page 305 is linked to personal voice web commerce service pages 332 including, by way of example, an apparel shops page 322, a luggage stores page 323, a gift shops page 324, a flower shops page 325, an office supplies stores page 326, and a book stores page 327. The personal commerce page provides commerce services that enables a subscriber to access catalogs associated with various retail establishments. As part of the commerce service, the personal voice web allows a subscriber to shop in various catalogs and then submit orders for selected items directly to the sponsor of the associated catalog. Orders are submitted to the catalog sponsor either as a voice web form or conventional web form sent to the sponsor, as an electronic message or using another means.

Personal profile page 302 links to a set of personalized voice web profile pages including an authentication page 306, a speech profile page 307, and an attributes and preferences page 308.

User authentication page 306 contains authenticating information including a subscriber account number, an encrypted password or personal identification number and links to a voice authentication signature MIME resource.

Figure 4:
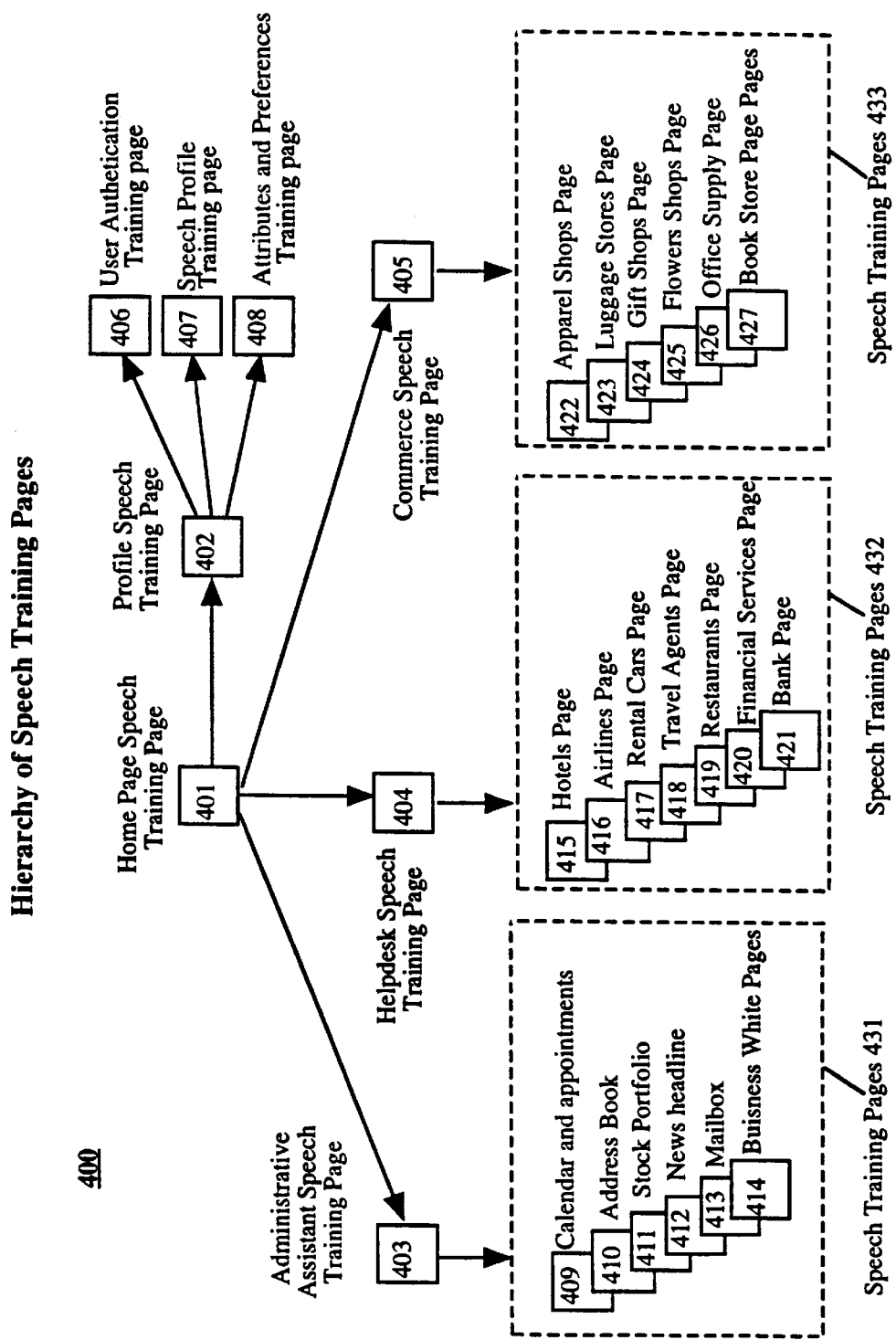
FIG. 4 illustrates a hierarchy of speech training pages that correspond to the service pages shown in FIG. 3.

Speech profile page 307 is linked to a hierarchy of speech training pages that correspond to the hierarchy of personal voice web 300. FIG. 4 shows the hierarchy 400 of speech training pages 401–427. Speech training pages 401–427 are sets of pre-captured training files to be used in performing speaker dependent speech recognition in providing the corresponding service to a subscriber. Each speech training page is thus accessed by the corresponding agent in performing the corresponding service. For example, the administrative assistant service accesses administrative speech training set 431 (including speech training pages 409–414). The helpdesk service accesses the helpdesk training page set 432 (including speech training pages 415–421). The commerce service accesses the commerce training page set 433 (including speech training pages 422–427).

Each speech training page 401–427 includes training data specifically tailored to the words more commonly associated with the corresponding service. For example, the calendar speech training page 409 includes training vocabulary to aid in the recognition of voice commands such as "Tenth", "November", "Tuesday" and so forth.

Referring now again to FIG. 3, personal attributes and preferences page 308 includes subscriber attribute information including name, account number, address, voice telephone number, fax telephone number, paging telephone number, encrypted credit card numbers and the like as well as personal preference information such as configuration, selection and presentation preferences. Personal attributes and preferences page 308 is also linked to hierarchy of attribute and preferences pages (shown in FIG. 5) that correspond to the hierarchy of personal voice web 300.

Figure 5:
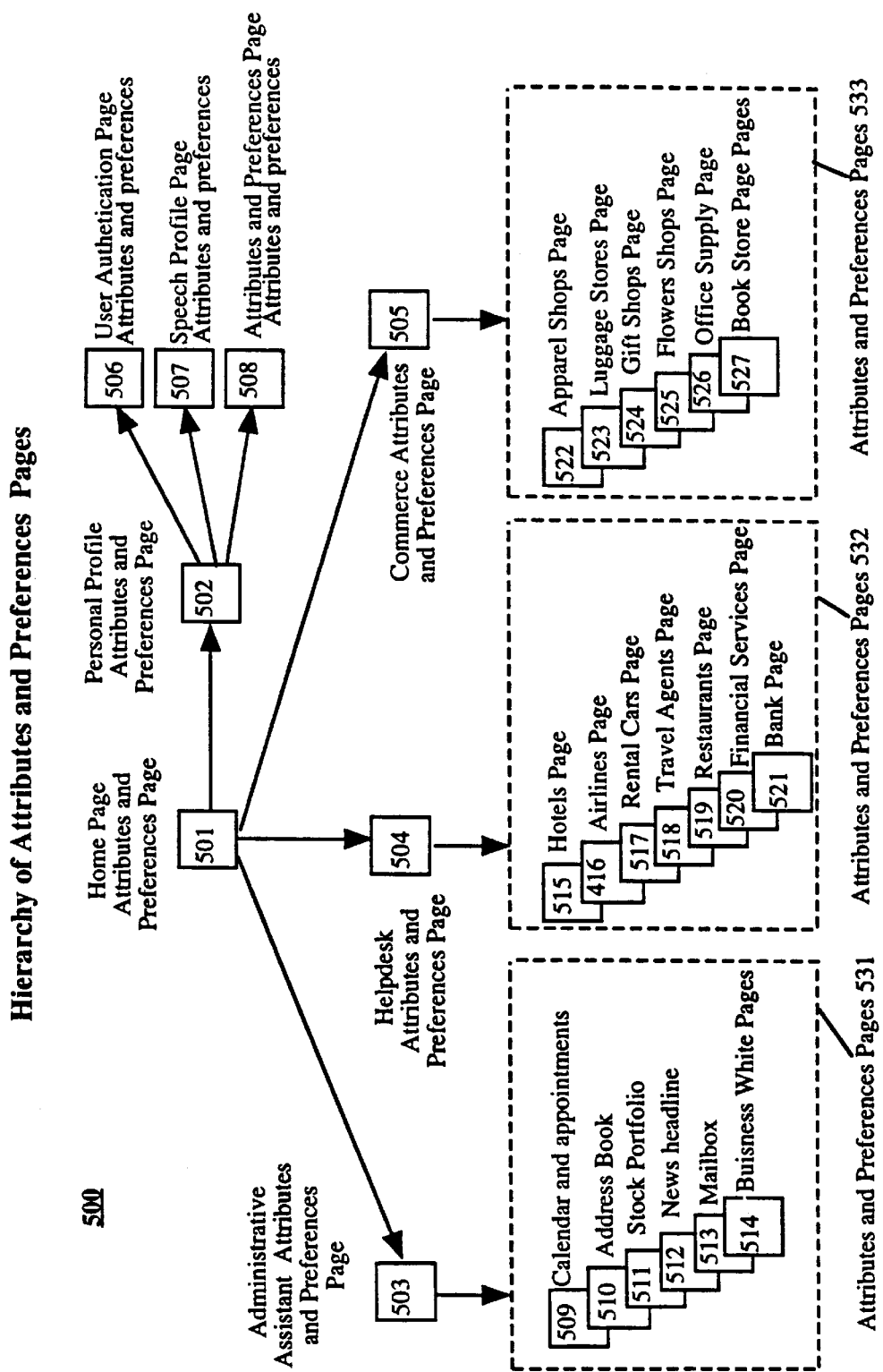
FIG. 5 illustrates a hierarchy of attributes and preferences pages that correspond to the service pages shown in FIG. 3.

FIG. 5 shows the hierarchy of attributes and preferences pages 501–527 associated with personal attributes and preferences page 308. Attributes and preferences pages 501–527 are pages that store subscriber-specific preference information to be used in providing the corresponding service to a subscriber. Each attributes and preferences pages 501–527 is thus accessed by the corresponding agent in performing the corresponding service. For example, the administrative assistant service accesses attributes and preferences set 531 (including attributes and preferences pages 509–514). The helpdesk service accesses the helpdesk attributes and preferences set 532 (including attributes and preferences pages 514–521). The commerce service accesses the commerce training page set 543 (including attributes and preferences pages 522–527).

It should be noted that the user profile information for multiple subscribers is stored in user profile databases. The user profile databases are accessed by service dependent profile agents. For example, personal identification and verification information of multiple subscribers is stored in a user profile home page database (a service database) and accessed by the subscriber's profile home page agent. Calendar attributes and preferences information for multiple subscribers is stored in the subscriber calendar attributes and preferences profile database (a service database). Calendar service specific speech training information for multiple subscribers is stored in the subscriber calendar speech training profile database (a service database). Calendar service profile agent responds to HTTP form requests for calendar attributes and preferences or calendar speech training profile page information for any particular subscriber and supplies the appropriate subscriber profile page information as HVML voice web pages.

The collection of profile pages for a single user constitute that user's personal voice web profile 300. Personal Voice web profile 300 need not be a collection of static HVML pages (voice web pages), but instead be generated dynamically using user profile page databases. However, once generated, these profile pages can be reused from various cache systems within the voice web system without having to retrieve them from their original databases thus saving significant time and resources.

In operation, a personal voice web service agent uses a corresponding service profile agent to retrieve subscriber and service specific attributes and preferences, speech training profiles and other information from the corresponding service profile database. The personal voice web service agent uses the retrieved subscriber and service specific information in personalizing the voice web service forms and pages as well as in enhancing and improving speech recognition by embedding the speech training profiles in the corresponding voice web forms and pages.

Referring back to FIG. 2B, for example, the calendar service agent 210 uses a corresponding calendar service profile agent 215 to retrieve subscriber specific calendar attributes and preferences included in profile database 216 by specifying the subscriber's calendar attributes and preferences profile URL as part of a profile request web form. Calendar service profile agent 215 responds to the submitted web form, retrieves the requested subscriber information from the calendar service profile database 216 and delivers it to calendar service agent 210 as a table formatted web page. Calendar service agent 210 retrieves the requested information from the table format in the web page and uses the subscriber's attributes and preferences to customize the voice web service form and page templates 213 before presenting them to the subscriber. In this way, the subscriber can have a personalized form or page presented to him/her without having to supply information about himself/herself repeatedly in each call.

Similarly, calendar service agent 210 uses a corresponding calendar service profile agent 215 to retrieve subscriber specific calendar speech training profiles from profile database 216 by specifying the subscriber's calendar speech training profile URL as part of a profile request web form. Calendar service profile agent 215 responds to the submitted web form retrieves the requested subscriber information from the calendar service profile database 216 and delivers it to the calendar service agent 210 as a table formatted web page. The calendar service agent 210 retrieves the requested information from the table format in the web page and embeds the subscriber's speech training profiles in the voice web form and page templates (pages 212,213) before delivering them to the voice web browser. The voice web browser uses these speech training profiles to dynamically change the active vocabulary in the voice processing software and hardware thereby customizing it to the subscriber.

Figure 2C:
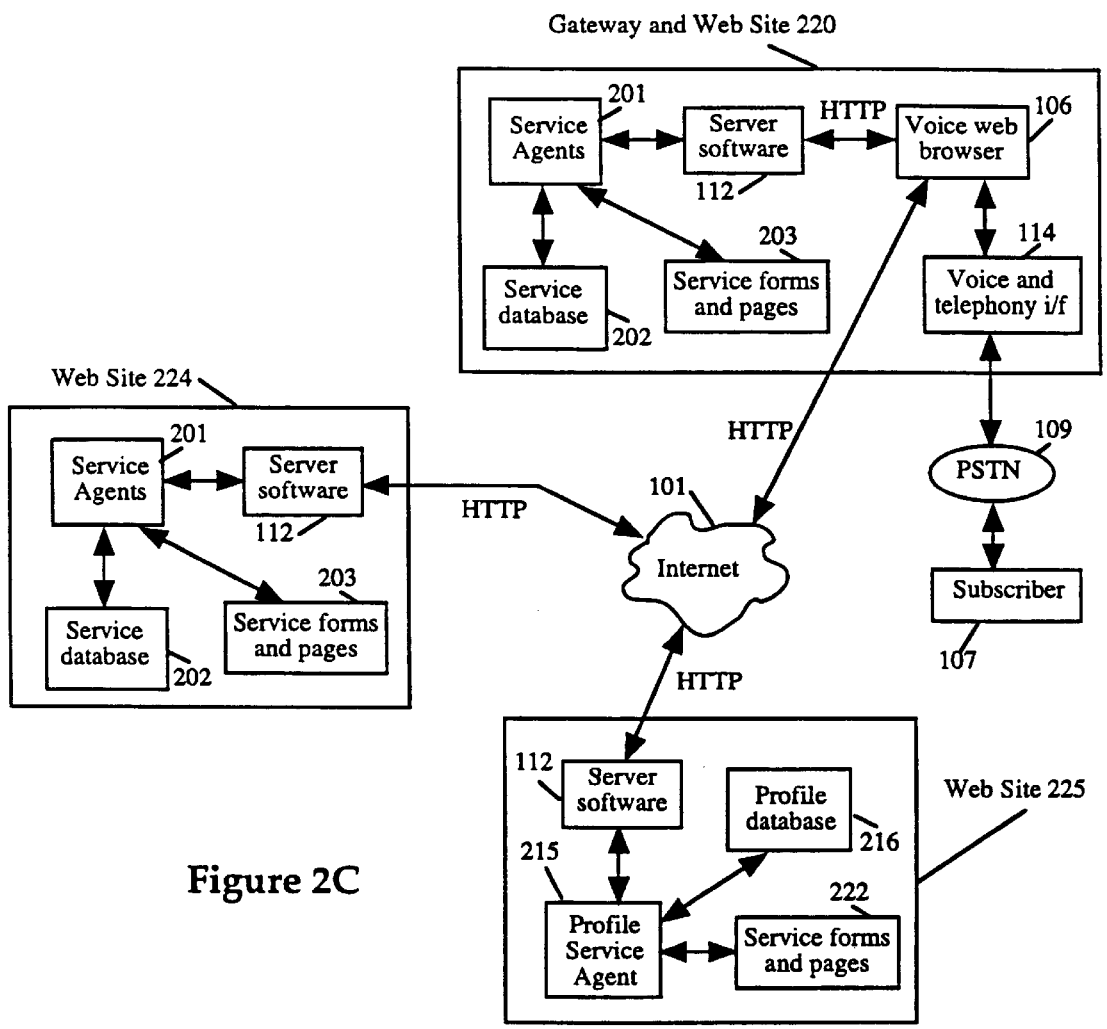
FIG. 2C is a functional block diagram of an alternative configuration of a voice web system in accordance with the present invention.

FIG. 2C is a functional block diagram of an alternative configuration of a voice web system in accordance with the present invention. The system includes a computer configures as a combined voice gateway and voice web site (combined site) 220. Combined site 220 includes gateway components such as a voice and telephony interface 114, a voice web browser 106 and server software 112. Combined site 220 additionally includes voice web site components such as service agents 201, service database 202 and service forms and pages 203. Combined web site 220 provides voice web access to a subscriber 107 coupling the combined site 220 via the PSTN 109. Because the voice gateway and voice web site functions are combined within a single computer environment, the server software 112 (located in combined site 220) and the voice web browser 106 exchange files without suffering the delays imposed by routing across the Internet 101. In certain applications, for example when a subscriber is accessing personal databases this configuration is advantageous to improve system performance. It should be noted, however, that even though server software 112 (located on combined site 220) and voice web browser 106 exchange files using a local interface as opposed to Internet 101, they nonetheless exchange files in accordance with HTTP.

Voice web browser 106 communicates with other web sites (such as web sites 224 and 225) using Internet 101. Web site 224 is a computer coupled to Internet 101 configured with server software 112, service agents 201, service database 202 and service forms and pages 203. Web site 224 is configured to deliver voice web services as described in reference to FIGS. 2A and 2B.

Web site 225 is a computer configured with server software 112, a profile service agent 223, service forms and pages 222 and profile database 221. Web site 225 is a universally accessible profile web site that is accessed by any other web site or web gateway in the voice web system as long as the accessing web site or web gateway has the appropriate URL information. Web site 225 provides user profile information to web site agents (such as service agents 201) located on other web sites (such as web site 224 and combined site 220). Advantageously, any web site and/or web gateway can thus access information stored in the profiles database 216 by hyperlinking to the web page associated with profile service agent 215.

User Authentication and verification

Personal voice web system 300 uses a login agent as a gatekeeper to the access of each subscriber's personal voice web. The login agent is a distributed software program that can receive subscriber information over a telephone, access the subscriber's personal profile pages from the subscriber's personal voice web and verify the subscriber's credentials over the telephone.

Figure 6:
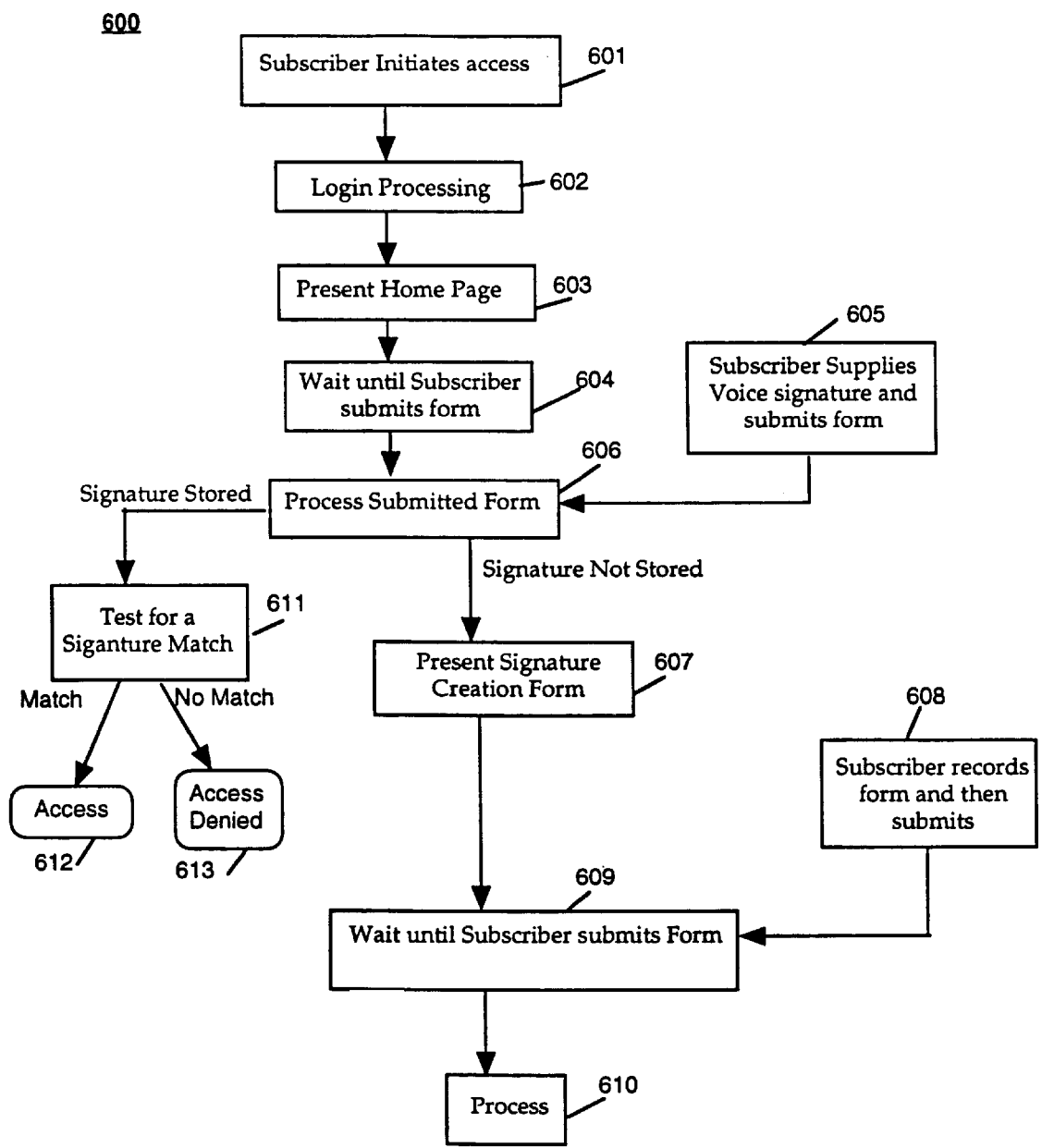
FIG. 6 is a flow diagram of a subscriber authentication method used in the delivery of the personal voice web services shown in FIG. 3.

Each system subscriber is given (i) an account number (ii) a personal identification number (PIN) and (iii) a service calling number. In order to access a personal voice web, the subscriber calls the service calling number and uses account information and the PIN to initiate a subscriber authentication process. FIG. 6 is a flow diagram of a subscriber authentication method 600 in accordance with the present invention. The subscriber authentication method 600 includes authentication signature creation form processing and subscriber authentication processing.

A subscriber initiates access 601 of his or her personal voice web 300 by calling the service calling number using a conventional telephone or a similar voice activated device computer configured to access the public telephone network. After the subscriber initiates access 601, a login agent starts login processing 602.

During login processing 602, the login agent answers the call and presents a standard login form to the subscriber. A login form is a voice form for collecting and submitting login information including subscriber account number and the subscriber PIN. After a subscriber enters the login information (into the login form) and submits the login form, the login agent uses the login information to retrieve the URL of the subscriber's personal voice web home page 301. The login agent retrieves the URL by looking up the subscriber's account number in the voice web subscriber directory. The login agent additionally verifies the PIN which was submitted. Upon verification of the PIN, the login agent presents 603 the subscriber's voice authentication form to the subscriber over the telephone. As part of the presentation, the login agent requests the subscriber to supply a personalized voice authentication sample. The login agent then waits 604 for the subscriber to supply the sample and submit 605 the form. After the subscriber submits 604 the form, the login agent processes 606 the submitted form. During processing 606 of the submitted form, the login agent accesses the subscriber's personal authentication page from the subscriber's personal voice web profile (linked to the subscriber's home page) and attempts to retrieve the voice authentication signature. If this is the first time the subscriber is accessing the service, the signature will be missing from the subscriber's authentication page. In this case, the login agent presents 607 the authentication signature creation form to the subscriber. Using the options presented in the signature creation form, the subscriber selects the option to create or modify the personal voice authentication signature. Following the instructions provided by the login agent, the subscriber fills in 608 the voice authentication signature creation form and records a personalized voice phrase as an authentication signature. After filling in 608 the signature creation form, the subscriber submits the form to the login agent. The login agent waits until the signature creation form is submitted 609. The login agent then processes 610 the recorded phrase converting it into a signature pattern and linking it to the user authentication page as a MIME resource for future verification.

If however, after processing 606, the login agent determines that there is an authentication signature stored in the subscriber's personal profile then the login agent perform a test 611 to determine whether there is a match between the stored authentication signature and the voice sample submitted by the subscriber. If test 611 determines that there is a match between the sample and the signature, then the subscriber is given access to the personal voice web and the voice web. Test 611 uses conventional voice authentication methods. A "match" is determined by test 611 when the conventional voice authentication method determines that the speaker's voice print or voice signature matches a master stored voice print or voice signature within a specified tolerance. If, however, the test determines that there is not a match between the sample and the signature, then the subscriber is denied access 613.

Enhanced Speech Recognition

Automatic speech recognition falls into three categories: speaker dependent, speaker adaptive, and speaker independent. A speaker dependent system is developed to work for a single speaker and are usually easier to develop, cheaper to buy and more accurate but requires the use of user-specific speech training files.

The size of the vocabulary of a speech recognition system affects the complexity, processing requirements and the accuracy of the system. Referring now again to FIG. 3, personal voice web 300 uses small to medium sized vocabularies (ten to hundred of words).

An isolated-word or discrete speech system operates on single words at a time requiring a pause between each word utterance. This conventional type of speech recognition is a simple form of recognition to perform because the end points are easier to find and the pronunciation of a word tends not to affect others. As the occurrences of the words are more consistent and sharply delimited they are easier to recognize. Personal voice web 300 focuses on discrete speech and in particular on speech used for command and control.

Personal voice web 300 typically uses speech coded at 8 kHz using 8 bit samples resulting in 64 kbps bandwidth and storage. Conventional adaptive pulse code modulation (ADPCM) techniques can reduce the bandwidth to 16 kbps without loss of information.

Personal voice web 300 uses conventional speaker dependent recognition of discrete speech. This conventional speaker dependent recognition relies on digital sampling of the word utterances. After sampling, the next stage is acoustic signal processing. Most techniques include spectral analysis. This is followed by recognition of phonemes, groups of phonemes and words. This stage uses many conventional processes such as Dynamic Time Warping, Hidden Markov Modeling, Neural Networks, expert systems and combination of techniques. Hidden Markov Modeling based techniques are commonly used and generally the most successful approach. Additionally, personal voice web 300 uses some knowledge of the language to aid the recognition process.

Personal voice web 300 improves speaker dependent recognition of discrete speech in a command and control context using universally accessible personal speech training profiles 401–427. As described above, the personal speech training pages 401–427 are organized as a linked collection of voice web profile pages each linked to the corresponding personal voice web service page. Thus, the personal speech training profile pages parallel the personal voice web service pages in structure as shown in FIGS. 3 and 5. Each speech training page 401–427 contains the training vocabulary for browser command and control that is context dependent.

Each service page 301–327 linked to the personal voice web home page 401 has a corresponding speech training page 402–427. The personal voice web 300 is constructed in such a way that each voice web service page 302–327 links to its corresponding speech training page 401–427 using its URL. As the subscriber navigates from service page to service page in the personal voice web 300, the system is able to access the corresponding speech training page using its embedded URL.

Each speech training page 401–427 contains a set of command and control key words and their personalized speech recognition patterns representing the context sensitive vocabulary for the corresponding service page. For example, the calendar and appointments service page 309 is linked to a corresponding speech training page 409 containing key words and recognition patterns for "year", "month", "day", the names of the months and days, digits representing dates and times etc. Similarly, stock portfolio page 311 is linked to a corresponding speech training page 411 containing key words and recognition patterns for "stock", "quote", "volume", "option", "symbol", names of companies in the portfolio etc.

Figure 7:
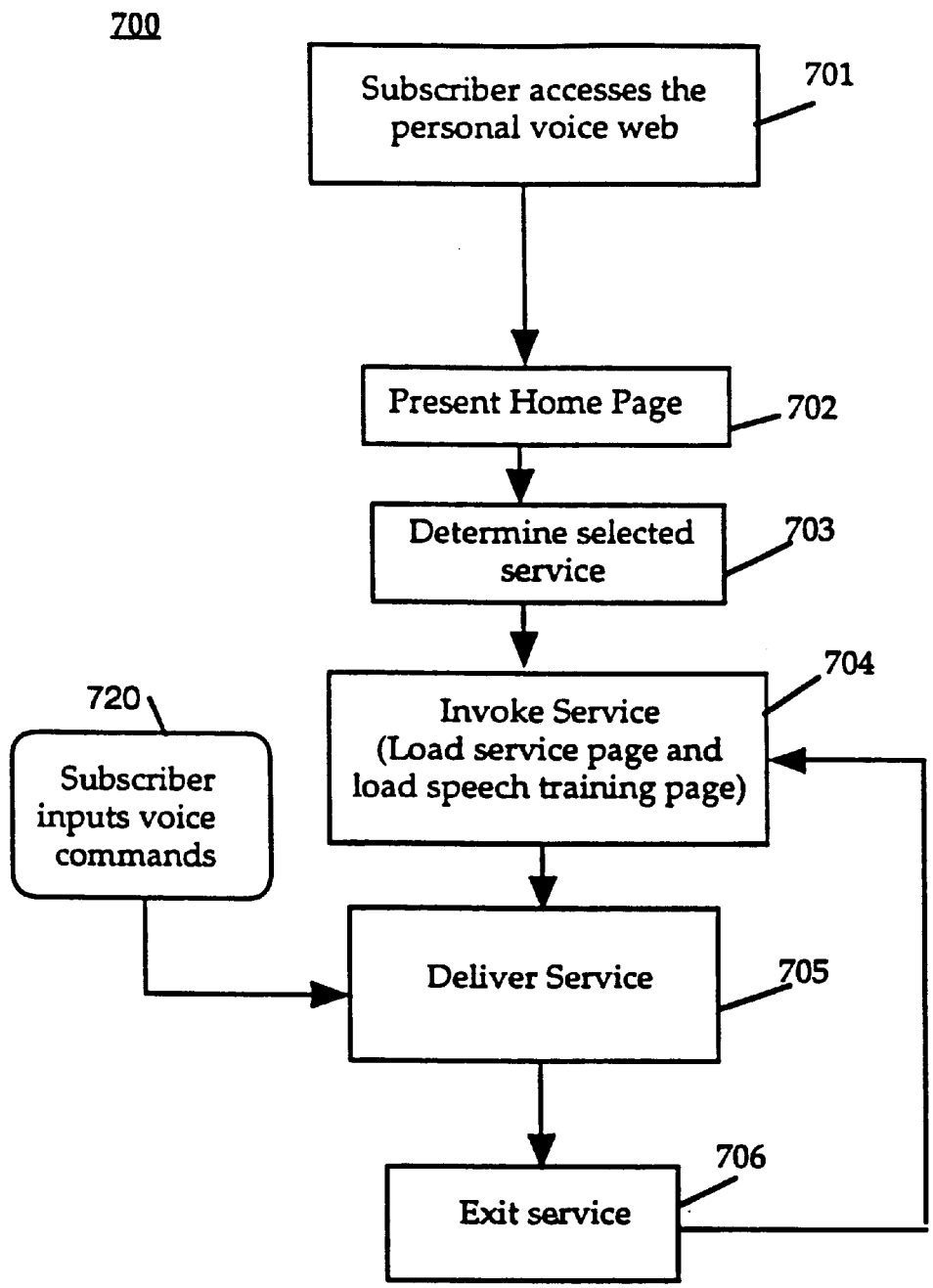
FIG. 7 is a flow diagram of an enhanced speech recognition processes used in personal voice web systems shown in FIG. 3.

FIG. 7 is a flow diagram of a speech recognition process 700 in accordance with the present invention. The process is initiated after a subscriber has gained access 701 to the personal voice web in accordance with the process described in reference to FIG. 6. Once the subscriber gains access to the personal voice web 701, the login agent accesses the subscriber's personal voice web home page and presents 702 the home page to the subscriber over the phone. During the process of presenting 702 the home page, the login agent loads the personal voice web profile page 302 and the speech profile page 501 containing the command and control vocabulary for the home page. Th is vocabulary includes the basic voice web browser command and control as well as home page specific command and control. From the home page, the subscriber requests a particular service (i.e. personal administrative assistant, the personal helpdesk or the personal catalog store). The home page agent determines 703 what service the subscriber has selected and in response, invokes 704 the selected service and then proceeds to deliver 705 the service. During invocation 704 of the service, both the service page and the speech training page associated with the service page are loaded on the voice web gateway where the voice web browser uses them to deliver the service and improve speech recognition.

During delivery 705 of the selected service, the service agent uses the speech training page associated with the selected service to recognize voice commands submitted 720 by the subscriber. Specifically, the service agent obtains the speech training profile, embeds it in the service page as a MIME resource and forwards it to the voice web browser which uses the training profiles to improve recognition. Thus, responding to the subscriber's voice commands pertinent to the accessed voice web service page, the voice web browser recognizes the command and control word utterances (the subscriber's voice commands that are submitted 720) and matches them against the personalized vocabulary in the corresponding voice web speech training page for accurate speaker dependent recognition of discrete speech.

If the subscriber requests access to a new service page linked to a currently accessible service page, the currently active service agent exits 706 the current service and then invokes 704 the requested service. During the invocation of the requested service, the requested voice web service page corresponding to the requested service is loaded as well as the corresponding speech training page containing the matching command and control vocabulary. In this process 700, the active service agent always uses the most appropriate vocabulary for the existing context thereby greatly reducing the size of the active vocabulary that needs be accessed while significantly improving the speaker dependent recognition.

Query localization and customization

Query customization uses stored subscriber attributes and preferences to customize queries of service databases. Query customization is accomplished by maintaining user attributes and preferences in a collection of voice web pages 501–527 (described above in reference to FIG. 5) that parallel the corresponding voice web service pages 301–327 (described above in reference to FIG. 6) and using the attribute and preferences information corresponding to the service requested to customize the query parameters within forms.

Referring now again to FIG. 5, the attributes and preferences pages 501–527 parallel the personal voice web service pages 301–327 in structure as shown in FIG. 3. Each service page linked to the personal voice web home page 301 has a corresponding voice web attributes and preferences page linked to it. The personal voice web 300 is constructed in such a way that each voice web service page 301–327 links to its corresponding voice web attributes and preferences page 501–527 using its URL. As the subscriber navigates from service page to service page in the personal voice web 300, the system is able to access the corresponding voice web attributes and preferences page using its embedded URL.

A subscriber of voice web services requests information by accessing a voice web service page and having it played by the corresponding agent (i.e. administrative assistant, helpdesk or commerce agent). The subscriber requests service through submitting a query form presented by the corresponding agent. The query form is an HVML form for touch tone and voice data input. When a service is requested by the subscriber, the agent retrieves the corresponding voice web attributes and preferences page and automatically fills the query form with appropriate default parameters obtained from the subscriber's attributes and preferences. For example if the subscriber is accessing the weather service page, the agent fills in the subscriber's home town and other chosen cities automatically from the subscriber's attributes and preferences page. Similarly, if the subscriber is accessing the stock portfolio service page, the agent accesses the corresponding attributes and preferences page and fills in the subscriber's chosen portfolio of stocks in the query form. In addition, the agent also automatically fills in the appropriate subscriber attributes such as his/her access account number, password etc., thereby easing the subscriber's access while exploiting the availability services through web based queries.

Figure 8:
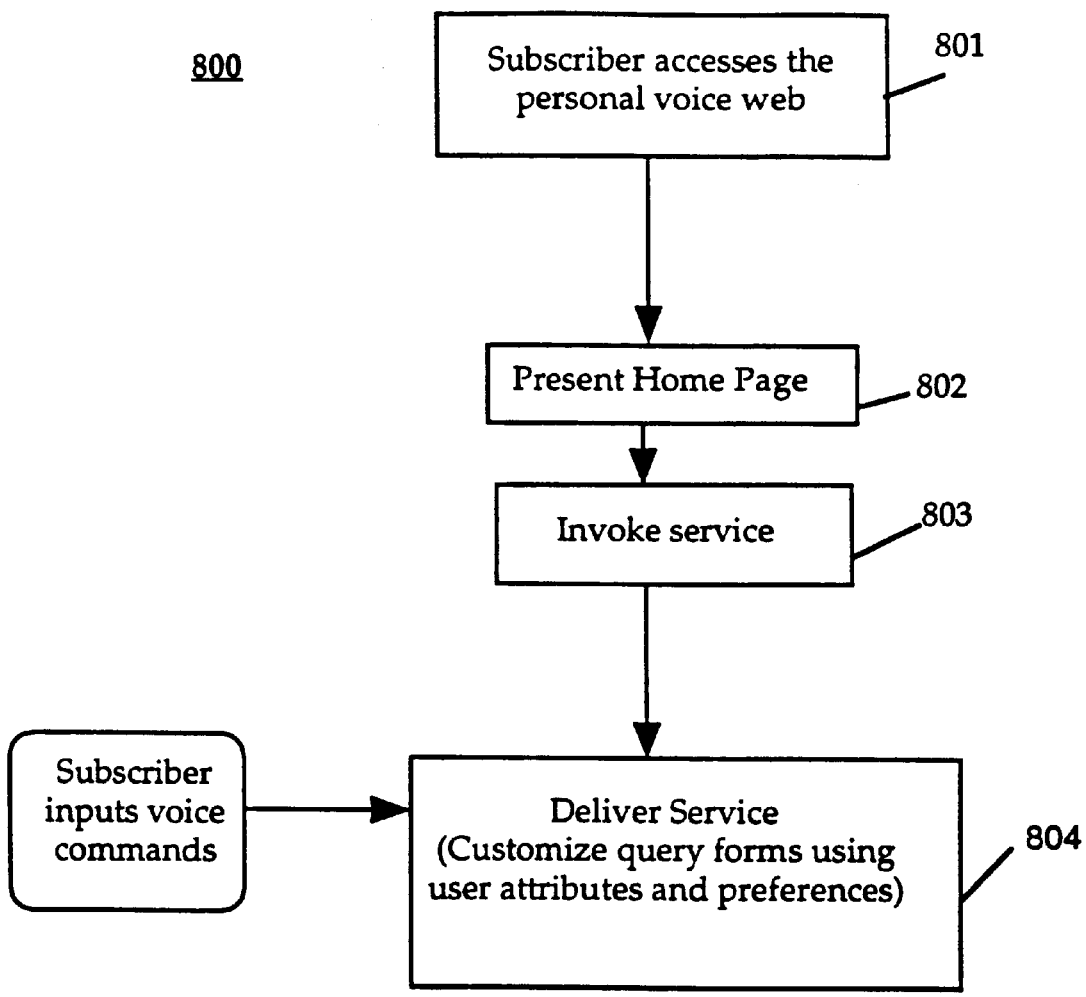
FIG. 8 is a flow diagram of a query customization process in accordance with the present invention.

FIG. 8 is a flow diagram of a query customization process 800 in accordance with the present invention. The process is initiated after a subscriber has gained access 801 to the personal voice web in accordance with the process described in reference to FIG. 6. Once the subscriber gains access 801 to the personal voice web, the login agent accesses the subscriber's personal voice web home page and presents 802 the home page to the subscriber over the phone.

During the process of presenting 802 the home page, the login agent loads the attributes and preferences page 501 from the subscriber's voice web personal profile. Attributes and preferences page 501 contains preferences for the home page 301. From the home page 301, the subscriber accesses the targeted voice web service page by navigating the appropriate hyper links from the voice web home page 301. In response, the selected service is invoked 803 and the selected service then proceeds to deliver 804 the service. During invocation 803 of the selected service, both the service page and the attributes and preferences page associated with the service page are extracted by the service agent.

During delivery 804 of the selected service, the service agent uses the attributes and preferences page associated with the selected service to customize queries of the associated service database. More specifically, using the attributes and preferences information, the service agent automatically fills in the needed fields in the corresponding query form with user specified defaults and preferences. Having filled the appropriate fields, the service agent plays the remaining query form to the subscriber thereby greatly reducing the information that the subscriber has to supply on the telephone. The service agent then obtains the remaining information, if any, from the subscriber and submits the query form to the service database. When the results are returned (i.e. the information is retrieved from the service database), the service agent plays the results to the subscriber over the telephone.

Form Based Voice Web Page Publishing

In another aspect of the invention, voice web system 100 enables publishers to compose voice web forms and pages statically using ordinary word processing programs and link them to voice files created using ordinary audio capture and editing tools available on personal computers and workstations. Alternatively, voice web agents can dynamically compose voice web pages and forms based on user requests and optionally profiles as well as accessed databases and services. Advantageously, dynamic form-based publication enables information and service providers to publish voice web pages using the conventional telephone without the need for any additional computer based voice web publishing tools. Dynamic form-based publication is achieved by combining voice web publishing forms, voice web publishing agents and voice web page publishing templates.

Figure 9:
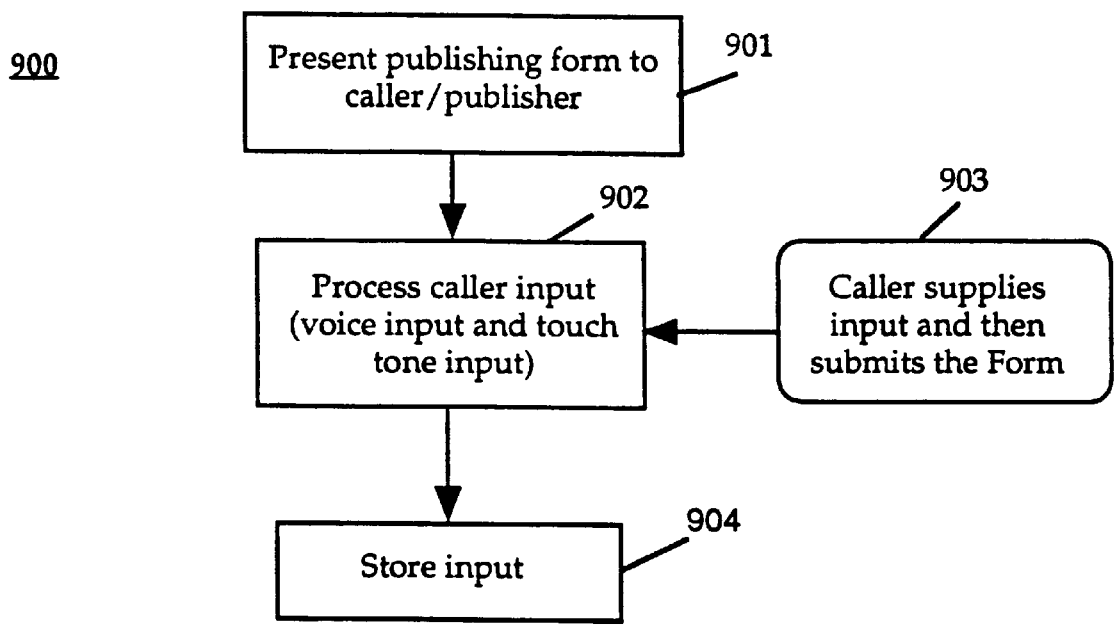
FIG. 9 is a flow diagram of a voice publishing method in accordance with the present invention.

FIG. 9 is a flow diagram of a voice publishing method in accordance with the present invention. The method presents 901 a voice web form to a caller calling into a voice web system using a conventional telephone. Voice web publishing forms are specially designed voice web forms that when interpreted (i.e. when played back) using the voice browser prompt the caller (the voice information publishers) to input voice and touch tone based input using a telephone. The forms guide the caller step by step to supply the needed information, edit and modify the information and finally submit 903 the information for processing 902.

Voice web publishing agents process 902 the filled voice web publishing forms extracting and separating voice information and touch tone input. Based on the touch tone inputs, the agents may present additional publishing forms to the caller (publisher). The voice information is stored 904 in voice files and linked to the corresponding voice web page publishing template by substituting variables within the page template with the generated files. The touch tone input is used whenever the caller (publisher) needs to input alphanumeric information that can be processed by the publishing agent.

Voice Web White, Yellow and Order Pages

Figure 10:
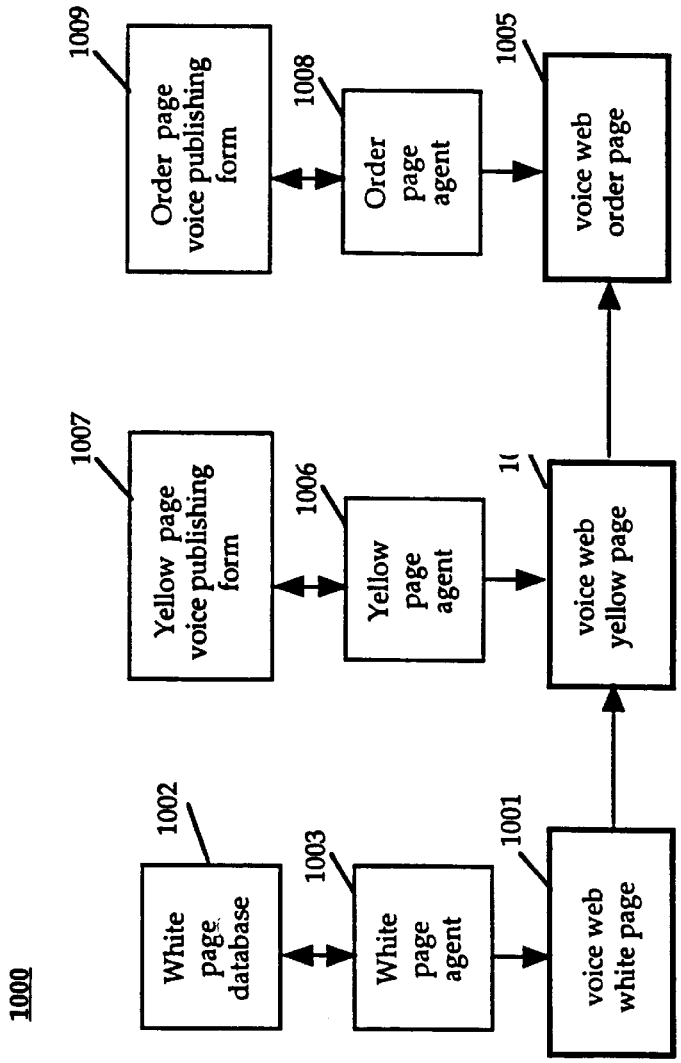
FIG. 10 is a system diagram of a business-yellow-order page system in accordance with the present invention.

Without limiting the general applicability of form based voice web page publishing, a specific application of the process of form-based publishing is next described. The exemplary form based publishing process relates to the publication of voice web business white pages, yellow pages and order entry pages. FIG. 10 shows a white-yellow-order page system 1000 in accordance with the present invention. Voice web business white pages 1001 are voice web pages that are dynamically composed by the voice web business white pages agent 1003 from a business white page database 1002 information including the name, address, phone number of businesses. The white pages agent 1003 presents a search form to a caller for specifying the name of the business and allows further narrowing of the search by city and state. Each business white page can be linked to a corresponding business yellow page 1004. Business yellow pages 1004 contain additional information about the business including a tag line, advertisement, directions, working hours, and promotions. In addition, each yellow page 1004 can be linked to a corresponding business order entry form 1005. Business order entry forms 1005 allow users to order products and services or transact business by specifying product or service codes, preferences, quantity, and credit card numbers for payment.

A participating business can publish a voice web yellow page 1004 by simply filing a corresponding voice web yellow page publishing form 1007. A yellow page publishing agent 1006 processes the yellow page publishing form 1007 and dynamically generates a business yellow page 1004 for that business from a standard yellow page template by replacing variables in the template with values supplied by the submitted yellow page publishing form.

The yellow page publishing agent 1006 (a publishing agent) presents a yellow page voice web publishing form 1007 to the participating business. Voice web publishing forms are specially designed voice web forms that when interpreted (i.e. when played back) using the voice browser prompt the caller (the voice information publishers) to input voice and touch tone based input using a telephone. Yellow page publishing form 1007 guides the caller step by step to supply the needed information, edit and modify the information and finally submit the information for processing, as described in reference to FIG. 9. Specifically, yellow page publishing form 1007 prompts for voice information including name, tag line, advertisement, directions, working hours and promotions. In addition, the yellow page publishing agent 1006 prompts for touch tone input including the account number, password, phone number, yellow page category code and credit card number. Yellow page publishing agent 1006 uses the account number to identify the business, the password to verify the business, the phone number to link it to the corresponding white page, the yellow page category code to classify the business within business yellow pages, and the credit card number to pay for the business yellow page. Once the business is identified and verified, yellow page publishing agent 1006 dynamically creates a business yellow page 1004 from a standard template for the appropriate category. Yellow page publishing agent 1006 uses the supplied business phone number to match with the appropriate database entry in the business white pages and updates it with the URL of the newly created yellow page to link it.

A very similar process occurs for publishing order entry forms. A business order entry form publishing agent, order page publishing agent 1008 presents an appropriate order entry publishing form 1009 to a participating business. Order page publishing agent 1008 requests for appropriate customized prompts for specific fields in the business order entry form such as product or service code, customer preferences, quantity, credit card number etc. Order page publishing agent 1008 also requests for touch tone input for the account number, password, phone number, and credit card number. Order page publishing agent 1008 uses the account number and password for identification and verification, the phone number to link it to the corresponding yellow page 1004 and the credit card number for payment for the order entry form. Once the business is identified and verified, order page publishing agent 1008 dynamically generates an order entry form for that business by filling the supplied information into a standard order entry template for that business category. Order page publishing agent 1008 uses the supplied business phone number to match with the appropriate database entry in the business white pages, updates it with the URL of the newly created order entry page, locates the corresponding yellow page using its URL in the database, and updates it to link to the newly created order entry page.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

APPENDIX A

I. HVML Specification

Hyper Voice Markup Language consists of a set of extensions to existing HTML. Some of the extensions are new elements with new tags and attributes. Others are extensions to existing elements in the form of new attributes. All attribute values are shown as %value type%.

In-line Voice components

The primary mechanism for introducing voice prompts into an HTML page is a new inline voice HVML element similar to the inline image HTML element. The tag for this element is "VOICE" and it has many variations. Each variation is specified by value of the TYPE attribute. Depending on the type, each variation has additional attributes.

Voice Files

<VOICE TYPE= "File" SRC= "%URL%" TEXT= "%text%">
VOICE tag with TYPE set to "File" indicates a file containing pre-recorded voice information. It's attributes are SRC and TEXT. SRC attribute specifies the URL for the voice file and TEXT attribute, which is optional, specifies the text that can be translated to speech as an alternative to the voice file.

Voice Index Files

<VOICE TYPE= "Index" SRC= "%URL%" INDEX= "%index%" TEXT= "%text%">
VOICE tag with TYPE set to "Index" indicates an indexed file containing pre-recorded voice phrases. It's attributes are SRC, INDEX and TEXT. SRC and TEXT have same meaning as in Voice Files. The INDEX attribute specifies index of the phrase within the file either as a number or a label.
For example:
<VOICE TYPE= "File" SRC="myweb/home/greeting.wav">

Text-to-Speech

<VOICE TYPE= "Text" TEXT= "%text%">
VOICE tag with TYPE set to "Text" indicates a text-to-speech string. It's attribute is TEXT which specifies the string that needs to be translated to speech.
For example:
<VOICE TYPE= "Text" TEXT="Welcome to your Home Page">

Voice Streams:

<VOICE TYPE= "Stream" VALUE= "%URL%" TERMINATE= "%tone%">
VOICE tag with TYPE set to "Stream" indicates a continuous voice stream identified by its URL. The browser accesses the voice stream and continuously plays it to the user. It's

APPENDIX A-continued attribute is TERMINATE which specifies the tone the user can enter to terminate the playback.
Currency <VOICE TYPE= "Money" VALUE= "%number%" FORMAT= "%format%">
VOICE tag with TYPE set to "Money" indicates a number that needs to be presented as currency. It's attributes are VALUE and FORMAT. VALUE specifies the decimal value of the number and FORMAT, which is optional, specifies the currency type such as "US Dollar", "British Pound" etc. The default value for FORMAT is "US Dollar".
Numbers <VOICE TYPE= "Number" VALUE= "%number%" FORMAT= "%format%">
VOICE tag with TYPE set to "Number" indicates a number that needs to be presented as a decimal number. It's attributes are VALUE and FORMAT. VALUE specifies the decimal value and FORMAT, which is optional, specifies the precision to be conveyed. Digits after the decimal point are pronounced as characters. Default value for the FORMAT is 2 which indicates 2 digit precision after decimal point.
Characters <VOICE TYPE= "Character" VALUE= "%string%>
VOICE tag with TYPE set to "Character" indicates a sequence of characters that are to be presented separately with no pauses in between. It's attribute is VALUE which specifies the sequence of characters as string.
Dates <VOICE TYPE= "Date" VALUE= "%date%" FORMAT= "%format%">
VOICE tag with TYPE set to "Date" indicates an expression that is to be presented as a date. It's attributes are VALUE and FORMAT. VALUE attribute specifies the expression and the FORMAT attribute, which is optional, specifies the format of the expression. Default format is MM/DD/YY.
Ordinals <VOICE TYPE= "Ordinal" VALUE= "%number%">
VOICE tag with TYPE set to "Ordinal" indicates a number that is to be presented as an ordinal (i.e. as Nth value). It's attribute is VALUE which specifies the number. Values are pronounced as "first", "second", "third" etc.
Strings:

<VOICESTRING NAME= "%name%">
. . . Voice Components . . .
</VOICESTRING>
VOICESTRING tag indicates a sequence of voice components that are grouped together for presentation without any pauses in between. Each of the voice components can be any of the primitives previously defined. The voice browser gathers the individual components and plays them together in sequence.
<Voicestring NAME= "welcome">
<Voice TYPE= "Index" SRC= "welcome.vap" INDEX= "begin" TEXT= "Welcome">
<Voice TYPE= "File" SRC= "username.vox" TEXT= "user's name">
<Voice TYPE= "Index" SRC= "welcome.vap" INDEX= "end" TEXT= "to VOIS NET"
</VoiceString>
The voice browser "plays" each in-line voice component in sequence as it encounters it in the HVML page starting from the beginning of the page. Each voice component is played only once for each presentation. A "reload" command would cause the voice browser to re-play the page.
Of course, voice elements can also be invoked by hyper links pointing to voice files containing digitized voice data. This is similar to existing HTML conventions. The voice browser simply fetches the new page and plays it once. In the next section, we will discuss how hyperlinks can be invoked using touch tone or key word input.
Voice responsive labels for hyper-links In order to invoke hyper links embedded in a HVML page, two new attributes "TONE" and "LABEL" are added to the anchor element. These attributes are used in conjunction with the existing HREF attribute in an anchor element that makes the anchor into a hyper link. When the user selects the touch tone signals specified by the value of the TONE attribute followed by the "#" tone or utters the word specified by the LABBL attribute, the browser invokes the corresponding hyper link. The TONE and LABEL attribute values must be unique within a page.
For example:
<A HREF="myweb/home/greeting.vml TONE="HELLO">
or
<A HREF="myweb/home/greeting.vml LABEL="HELLO">
When the user presses "H,E,L,L,O,#" on the touch tone phone or the user says the word "HELLO" on the phone, the browser will invoke the corresponding hyper link and accesses the "greeting.vml" page.
Keyword accessible indexes for anchors HTML allows the index access of fragments within a page by unique labels associated with anchors surrounding the fragment. The NAME attribute in an anchor element specifies a label that is unique within the page. This label can then be used as an index by

APPENDIX A-continued the browser to search for the fragment by matching the unique label with the one supplied in the hyperlink. The hyperlink for the indexed fragment uses the regular URL for the page concatenated with the fragment's unique label with a "#" separator.
Coupled with voice responsive hyper links, fragment labels can be used to construct simple menus or database searches.
For example:
Suppose "myweb/home/prompts.vml" contains the following HVML text.
<A NAME="prompt1">
<VOICE TEXT="Press CAL# for Calendar">
</A>
<A NAME="prompt2">
<VOICE TEXT="Press ADDR# for Address Book">
</A>
<A NAME="prompt3">
<VOICE TEXT="Press EMAIL for Electronic Mail">
</A>
Suppose another HVML page contains the following hyperlinks.
<A HREF="myweb/home/prompts.vml#prompt1" TONE="1">Press 1 to hear Prompt1</A>
<A HREF="myweb/home/prompts.vml#prompt2" TONE="2">Press 2 to hear Prompt2</A>
<A HREF="myweb/home/prompts.vml#prompt3" TONE="3">Press 3 to hear Prompt3</A>
Then, if the user presses "1,#", the browser will fetch the "myweb/home/prompts.vml" HVML page, match "prompt1" index with the first anchor's "prompt1" label, and start presenting the prompts starting with text-to-speech translation of "Press CAL# for Calendar".
Browser Control <PAUSE TIMEOUT= "%seconds%" TERMINATE= "%tone%">
In order to let the voice page publisher to control the behavior of the voice browser, HVML defines a tag "Pause" with "TIMEOUT" and "TERMINATE" attributes. When the browser encounters a PAUSE statement, it pauses until either the amount of time specified in the TIMEOUT attribute elapses or the user enters the tone specified in the "TERMINATE" attribute. If the values of the TIMEOUT attribute is 0, then the browser waits there indefinitely. The default value for TIMEOUT is 1 second. Default value for TERMINATE is "#".
Voice Responsive Forms HVML uses the FORM tag to enable user input similar to HTML including the METHOD attribute which specifies the way parameters are passed to the server and the ACTION attribute which specifies the procedure to be invoked by the server to process the form. HVML extends the INPUT tag within forms by introducing VOICEINPUT tag. VOICEINPUT takes a TYPE attribute similar to the INPUT tag with three new values "voice", "tone" and "review" in addition to the existing "reset" and "submit" values.
The HVML browser pauses at each VOICEINPUT statement in a HVML form until the specified input is supplied or input is terminated before processing the remaining form. The VOICEINPUT tag with TYPE value set to "voice" indicates a form that accepts voice input. Usually, a voice prompt or text-to-speech segment precedes the VOICEINPUT tag alerting the user that input is required and how to terminate input. The user is expected to speak and this message is recorded in real-time and supplied to the Voice Web server for processing. The VOICEINPUT tag containing "voice" value for the TYPE attribute also supports a MAXTIME attribute which specifies the maximum recording time for the message and a TERMINATE attribute which specifies the touch tone that terminates input. If the MAXTIME attribute is not specified, then the default value of "15" is assumed. If TERMINATE attribute is not specified, then the default value of "#" is assumed. For example, if the MAXTIME value is 20 and TERMINATE value is "#", then recording terminates when the user presses "#" or 20 seconds of time elapses.
The VOICEINPUT tag with TYPE value set to "tone" indicates a form that accepts touch tone input. Again, a voice prompt or a text-to-speech segment precedes the VOICEINPUT tag alerting the user for input. The user is expected to press a sequence of touch tones which are recorded and supplied to the Voice Web server for processing. The VOICEINPUT tag containing "tone" value for the TYPE attribute also supports a MAXDIGITS attribute which specifies the maximum number of touch tone digits that can be supplied and a TERMINATE attribute which specifies the touch tone that terminates input. If the MAXDIGITS attribute is not specified, then the default value of "20" is assumed. If TERMINATE attribute is not specified, then the default value of "#" is assumed. For example, if the MAXDIGITS value is 10 and TERMINATE value is "#", then input process terminates when the user presses "#" or 10 digits are supplied.
The VOICEINPUT tag with TYPE value set to "review" indicates that the current values of the form can be reviewed by selecting the "review" input. The VOICEINPUT tag with TYPE value set to "reset" indicates that the current values of the form should be reset to their original defaults. The VOICEINPUT tag with TYPE value set to "submit" indicates that the current form should be submitted to the server. Each of these three TYPE values support a SELECTTONES attribute and a SKIPTONES attribute. SELECTTONES attribute specifies the sequence of touch tones that activates the corresponding selection. SKIPTONES attribute specifies the sequence of touch tones that skips the selection. If the SELECTTONES attribute is not specified, then the default value of "#" is assumed and

APPENDIX A-continued if the SKIPTONES attribute is not specified, then the default value of "*" is assumed. For example, if the SELECTTONES attribute value is "REVIEW" and SKIPTONES attribute value is "SKIP" for a VOICEINPUT element with TYPE value set to "review", the user can enter "REVIEW" to review the form values or enter "SKIP" to skip the selection. VOICEINPUT tag with TYPE value set to "submit" similarly indicates the values of the form can be submitted to the server. If the SELECTTONES attribute value is "DONE" and the SKIPTONES attribute value is "", the user can either enter "DONE" to submit the form or press "" to skip the selection. VOICEINPUT tag with TYPE value set to "reset" similarly indicates that the values of the form be reset to their original values.

II. Voice Browser Commands

All browser commands must start with the "*" key. Each browser command is associated with one or more key words that uniquely identify it. For example, in order to activate "Home" command, the user would press "*home" on the telephone key pad. The key words are chosen in such a way to generate unique dial tone sequences. A set of default browser commands are listed below with the keyword and description of the command. Alternatively, the browser commands can also be issued by vocalizing the corresponding commands. For example, to activate the "Home" command, the user would say "home" on the telephone.

Previous

Jump to the previous page from which the current page was accessed via a hyper link. This command is activated by pressing "*pr" (*77) or "*prev" (*7738) sequence.

Next

Jump to the next page in a sequence of hyper links. This command is activated by pressing "*n" (*6) or "next" (*6398) sequence.

History

Present the titles of the pages accessed so far in the order of their hyper link access sequence. Pause after each title. If the user presses "#", then jump to the page specified by the title. If not, proceed to the next title. This command is activated by pressing "*hi" (*44) or "*hist" (4478) sequence.

Home

Jump to the first page in the sequence of hyper links. This command is activated by pressing "*ho" (*46) or "*home" (*4663) sequence.

Reload

Reload the current page again from the Web server. This command is activated by pressing "*re" (*73) or "*relo" *(7356) sequence.

Help

Jump to the home page of the help page set. Help pages are navigated in exactly the same way as ordinary HVML pages. However, a new browser instance is, created on activation which must be "exited" to get back to the page context from which "Help" page set was accessed. This command is activated by pressing "*h" (*4) or "*help" (*4357) sequence.

Fax

Jump to the home page of the Fax dialog session using HTML forms. Again, a new browser instance is created on activation which must be "exited" to get back to the page context from which "Fax" dialog session was activated. This command is activated by pressing "*fa" (*32) "*fax" (*329) sequence.

Stop

Stop loading the page that is currently being accessed. This command is activated by pressing "*t" (*8) or "*stop" (*7867) sequence.

Exit

Exit the current instance of the browser and return to the page being accessed in the previous instance of the browser. If this is the first instance of the browser, then exit the browser and hang-up the phone. This command is activated by pressing "*x" (*9) or "*exit" (*3948) sequence.

Bookmarks

Present the titles of the pages selected as bookmarks in the order of their hyper link access sequence. Pause after each title. If the user presses "#", then jump to the page specified by the title. If not, proceed to the next title. This command is activated by pressing "*bo" (*26) or "*book" (*2665) sequence.

III. Voice Browser Playback Controls

When the Voice browser is activated to play back voice prompts or speech segments, an additional set of browser commands are available to the user to control the playback.

Pause

Pause the play back at current position. This command is activated by pressing

APPENDIX A-continued

"*p" (*7) or "*pause" (*72873).
Play

Continue play back from current position. This command is activated by pressing
"*p" (*7) or "*play" (*7529).
Backup Back up the play back position by 5 seconds and start play back. The command is
activated by pressing "*b" (*2) or "*back" (*2225). Repeated pressing of the
same tone implies successive back up by 5 seconds for each tone.
Forward Forward the play back position by 5 seconds and start play back. The command is
activated by pressing "*f" (*3) or "*frwd" (*3793). Repeated pressing of the same
tone implies successive skip forward by 5 seconds for each tone.
Start Back up the play back position to the beginning of the play back sequence and
start play back. The command is activated by pressing "*0".
End Jump to the end of the play back sequence, backup by 5 seconds and start play
back. The command is activated by pressing "*1".

What is claimed is:

1. A method of delivering caller-customized voice-based information to a caller, comprising:
   storing caller-specific information in a computer file at a universal resource locator (URL):
   determining a URL associated with the caller;
   retrieving the caller-specific information using the URL;
   processing at least one caller command received over the telephone to determine a service request;
   retrieving information responsive to the service request and responsive to the caller-specific information, including;
   generating a database query form responsive to the service request;
   customizing the database query form using the caller-specific information; and
   performing a database search using the query form, wherein generating a database query form responsive to the service request includes:
   storing a voice form associated with the service request at a universal resource locator (URL) address in the computer network wherein the voice form is stored in a markup language;
   playing the voice form to the caller to generate at least one information prompt for the caller;
   collecting information from the caller in response to each prompt; and
   generating a database query form using at least a portion of the collected information; and
   playing back the retrieved information to the caller over the telephone.

2. The method of claim 1 wherein collecting information from the caller in response to each prompt includes collecting touch tone inputs from the caller.

3. The method of claim 1 wherein collecting information from the caller in response to each prompt includes collecting voice command inputs from the caller and performing speech recognition on the voice command inputs.

4. A method of processing voice-based information received from a telephone caller over a computer network, comprising:
   storing a voice form at a universal resource locator (URL) address in the computer network wherein the voice form is stored in a markup language with voice extensions; and
   during a calling session:
   playing the voice form to the caller to generate at least one information prompt to the caller;
   collecting information from the caller in response to each prompt; and
   storing the collected information in a first markup language document and including in the document a hyperlink to a second markup language document.

5. The method of claim 4 wherein the hyperlink is determined responsive to at least a portion of the collected information.

6. A method of processing voice-based information received from a telephone caller over a computer network, comprising;
   storing a voice form at a universal resource locator (URL) address in the computer network wherein the voice form is stored in a markup language with voice extensions; and
   during a calling session:
   playing the voice form to the caller to generate at least one information prompt for the caller;
   collecting information from the caller in response to each prompt; and
   storing the collected information in a first markup language document and including in a second markup language document a hyperlink to the first markup language document.

7. The method of claim 6 wherein the hyperlink is determined responsive to at least a portion of the collected information.

8. A system for delivering information over a telephone, comprising:
   a business white pages database including business name, address and phone number information;
   a database query form;
   a first processing agent programmed to:
   collect user information using a voice based telecommunications device;
   include at least some of the collected information to the database query form;
   search the database by applying the database query form to the database to retrieve information; and
   generate a voice web page having a universal resource locator (URL) address using the retrieved information;

a yellow page database including business advertising information; and a second processing agent wherein the voice web page generated by the first processing agent includes a hyperlink to the second processing agent and wherein the second processing agent is programmed to:

search the yellow page database to retrieve information; and generate a voice web page using the retrieved information; and a voice web browser adapted to play voice web pages to a user.

9. The system of claim 8 wherein the hyperlink identifies an entry in the yellow page database and wherein searching the yellow page database comprises locating the yellow page database entry identified by the hyperlink.

10. The system of claim 8 further comprising:

an order page database including business order information; and a third processing agent wherein the voice web page generated by the second processing agent includes a second hyperlink to the third processing agent and wherein the third processing agent is programmed to:

search the order page database to retrieve information; and generate a voice web page using the retrieved information.

11. The system of claim 10 wherein the second hyperlink identifies an entry in the order page database and wherein searching the order page database comprises locating the order page database entry identified by the hyperlink.

* * * * *